US012754435B2

(12) United States Patent
Chang et al.

(10) Patent No.: US 12,754,435 B2
(45) Date of Patent: Oct. 6, 2026

(54) ADJUSTABLE BAND OF WEARABLE ELECTRONIC DEVICE

(71) Applicant: Apple Inc., Cupertino, CA (US)

(72) Inventors: Ray L. Chang, Saratoga, CA (US); Michael J. Rockwell, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/666,649

(22) Filed: May 16, 2024

(65) Prior Publication Data

US 2024/0385455 A1 Nov. 21, 2024

Related U.S. Application Data

(60) Provisional application No. 63/502,641, filed on May 16, 2023.

(51) Int. Cl.
*G02B 27/01* (2006.01)

(52) U.S. Cl.
CPC ................................ *G02B 27/0176* (2013.01)

(58) Field of Classification Search
CPC .................................................. G02B 27/0176
See application file for complete search history.

(56) References Cited

U.S. PATENT DOCUMENTS

| | | | | |
|---|---|---|---|---|
| 8,736,692 B1 * | 5/2014 | Wong | H04N 9/3173 348/208.4 |
| 2009/0230229 A1 * | 9/2009 | Yasuda | B65H 75/4431 242/395 |
| 2010/0229286 A1 * | 9/2010 | Ahlgren | A42B 3/145 2/416 |
| 2013/0031697 A1 * | 2/2013 | Woda | A42B 3/0473 2/171.2 |
| 2014/0375540 A1 * | 12/2014 | Ackerman | G06F 3/16 345/156 |
| 2017/0261388 A1 * | 9/2017 | Ma | G01L 1/2287 |
| 2018/0046147 A1 * | 2/2018 | Aghara | G06F 3/012 |
| 2020/0064635 A1 * | 2/2020 | Franklin | G02B 27/0955 |
| 2021/0068277 A1 * | 3/2021 | Mulliken | G02B 27/0179 |
| 2021/0271093 A1 * | 9/2021 | Poore | G02B 27/017 |
| 2022/0042646 A1 * | 2/2022 | Roig | G06F 3/011 |

* cited by examiner

*Primary Examiner* — Kwang-Su Yang
(74) *Attorney, Agent, or Firm* — Dorsey & Whitney LLP

(57) ABSTRACT

A wearable electronic device including a pressure sensor and an adjustable band is disclosed. In an example, a head-mountable device (HMD) includes a display; a housing coupled to the display; a force transducer coupled to the housing; and an adjustable band coupled to the housing, the adjustable band being adjustable in response to a pressure detected by the force transducer.

20 Claims, 20 Drawing Sheets

ADJUSTABLE BAND OF WEARABLE ELECTRONIC DEVICE

CROSS-REFERENCE TO RELATED APPLICATION

This claims priority to U.S. Provisional Patent Application No. 63/502,641, filed 16 May 2023, entitled "ADJUSTABLE BAND," the entire disclosure of which is hereby incorporated by reference.

FIELD

The described examples relate generally to devices that include sensors and bands that are adjustable in response to signals generated by the sensors. More particularly, the present examples relate to using sensors to detect and reorient the position of an electronic device.

BACKGROUND

Recent advances in portable computing have enabled head-mountable devices that provide augmented and virtual reality (AR/VR) experiences to users. Head-mountable devices typically include various components such as a display, a viewing frame, a lens, a battery, a motor, a speaker, and other components. These components can operate together to provide an immersive user experience.

Head-mountable devices can include headbands or other components for retaining a respective head-mountable devices on a user's head during use. Users of the head-mountable device can have different preferences for tension in the headband, the head-mountable device can be used for varying activities have different tension requirements, user preferences for the tension can change over time, and the like. As a result, the ability to adjust the tension in the headband of the head-mountable device is desired.

SUMMARY

According to some aspects of the present disclosure, a head-mountable device (HMD) includes a display, a housing coupled to the display, a force transducer coupled to the housing, and an adjustable band coupled to the housing. The adjustable band can be adjustable in response to a pressure detected by the force transducer.

In some examples, the force transducer is a first force transducer, and the HMD further includes a second force transducer and a tension adjustment system coupled to the adjustable band. In some examples, the first force transducer can be configured to be adjacent to a forehead region of a user of the HMD. In some examples, the second force transducer can be configured to be adjacent to a maxilla or zygoma region of the user of the HMD. In some examples, the tension adjustment system can be configured to automatically adjust tension in the adjustable band in response to at least one of a first pressure detected by the first pressure sensor or a second pressure detected by the second pressure sensor.

In some examples, the display can be configured to provide tension adjustment instructions in response to the pressure detected by the force transducer. In some examples, the adjustable band can include a cable and a dial configured to alter an effective length of the cable to adjust tension applied to the adjustable band by the cable.

In some examples, the adjustable band can include a first tension adjustment system, and a second tension adjustment system. In some examples, the first tension adjustment system can be configured to adjust tension applied to a first region of the adjustable band, and the second tension adjustment system can be configured to adjust tension applied to a second region of the adjustable band independent from the first tensioning system.

In some examples, the HMD further includes a tension adjustment system that can be configured to adjust tension in the adjustable band in response to the pressure detected by the force transducer. In some examples, the tension adjustment system can include a motor electrically coupled to a processor of the HMD.

According to some examples, an electronic device includes a display, a pressure sensor coupled to the display, and an adjustable band coupled to the display. The adjustable band can include a tension adjustment system configured to adjust tension in the adjustable band in response to a signal from the pressure sensor.

In some examples, the tension adjustment system can include a cable coupled to the adjustable band, and a dial that can be configured to adjust an effective length of the cable in response to the signal from the pressure sensor.

In some examples, the electronic device can further include an inertial measurement unit. In some examples, the tension adjustment system can be further configured to adjust the tension in the adjustable band in response to a signal from the inertial measurement unit indicating an orientation of the electronic device.

In some examples, the display can be configured to display instructions for adjusting the tension in the adjustable band in response to the signal from the pressure sensor.

In some examples, the electronic device can further include an optical sensor coupled to the display. In some examples, the display can be configured to display instructions for adjusting a position of the electronic device in response to a signal from the optical sensor.

According to some aspects, a method includes detecting a force between a wearable electronic device and a user, and adjusting a tension in an adjustable band of the wearable electronic device in response to the detected force.

In some examples, the method can further include providing a tension adjustment instruction to the user in response to the detected force. In some examples, the tension in the adjustable band can be adjusted in response to the tension adjustment instruction. In some examples, the method can further include providing a tension adjustment instruction to a motor of a tension adjustment system of the wearable device in response to the detected force. In some examples, the tension in the adjustable band can be adjusted in response to the tension adjustment instruction.

In some examples, the method can further include determining an activity type for use of the wearable electronic device by the user. In some examples, the tension in the adjustable band can be adjusted in response to the determined activity type. In some examples, the method can further include determining a duration of use for the wearable electronic device by the user. In some examples, the tension in the adjustable band can be adjusted in response to the determined duration of use. In some examples, the method can further include associating the wearable electronic device with a user profile. In some examples, the tension in the adjustable band can be adjusted in response to the associated user profile.

In some examples, the method can further include determining a position of the wearable electronic device relative to a landmark on the user, and providing a position adjustment instruction to the user in response to the determined position of the wearable electronic device relative to the landmark on the user.

In some examples, the force can be detected by a force transducer, and the tension can be adjusted by a tension adjustment system. In some examples, the tension adjustment system can include a cable and a dial. In some examples, the method can further include adjusting the tension in the adjustable band by rotating the dial to alter an effective length of the cable.

BRIEF DESCRIPTION OF THE DRAWINGS

The present systems and methods should be understood by the following detailed description in conjunction with the accompanying drawings, wherein like reference numerals designate like structural elements, and in which.

DETAILED DESCRIPTION

Figure 1A:
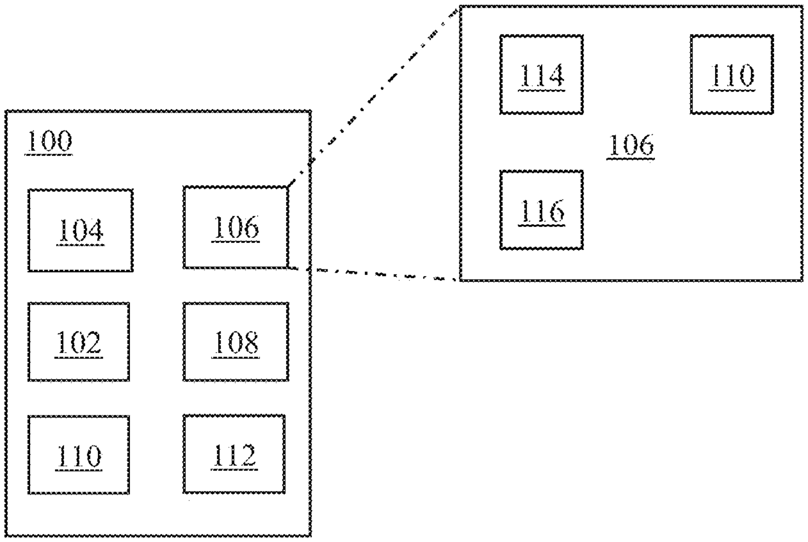
FIG. 1A is a schematic block diagram of a head-mountable device.

Detailed reference to the embodiments included in the accompanying drawings is provided blow. The descriptions are not intended, and should not be interpreted as, limiting the present systems and methods to a single embodiment. Rather, the description is intended to cover any number of changes, modifications, alternatives and equivalents as can be included within the description and the appended claims.

Portable electronic devices, such as smart phones, laptops, tablet computing devices, smart watches, head-mountable displays (HMDs), and headphones, have become commonplace for persons undertaking daily activities (e.g., travel, communication, education, entertainment, employment, etc.). Indeed, portable electronic devices can provide assistance in completing daily tasks and errands, such as, watching an instructional video or monitoring progress during and after an exercise routine. Some electronic devices, such as HMDs and smart watches, utilize mounting systems for mounting the electronic devices on a user's body, such as on a user's head or a user's wrist. As an example, an HMD can be mounted on a user's head using a headband, which can be adjustable. A user can don the HMD and adjust the position of the HMD and tension in the headband when the HMD is donned. However, users can desire different tension to be applied to the HMD through the headband based on their own preferences, the duration of use of the HMD, types of activities for which the HMD is used, and the like.

Various examples disclosed herein relate to improved mounting systems for electronic devices, and methods of using the same. A mounting system for an electronic device can include an adjustable band, which can include a sensor and a tension adjustment system. The sensor can detect a force between the electronic device and the user (e.g., a force applied by the electronic device to the user). The tension adjustment system can automatically adjust tension in the adjustable band based on the force detected by the sensor, or the electronic device can display a prompt for a user to adjust the tension in the adjustable band based on the force detected by the sensor. The tension adjustment system can also automatically adjust tension in the adjustable band, or the electronic device can display a prompt for a user to adjust the tension in the adjustable band based on user preferences (e.g., associated with a user profile), a type of activity performed while using the electronic device, a duration for which the electronic device is used, or the like. Additionally or alternatively, the sensor can detect a relative position of the electronic device and a feature on a user's body, such as a feature on the user's head, wrist, or the like. The electronic device can display a prompt to alter the position of the electronic device based on the relative position detected by the sensor. The mounting system can be used to provide improved comfort and visual alignment for the electronic device while a user is wearing the electronic device, thereby improving a user experience.

These and other examples are discussed below with reference to FIGS. 1A through 14. However, those skilled in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1B:
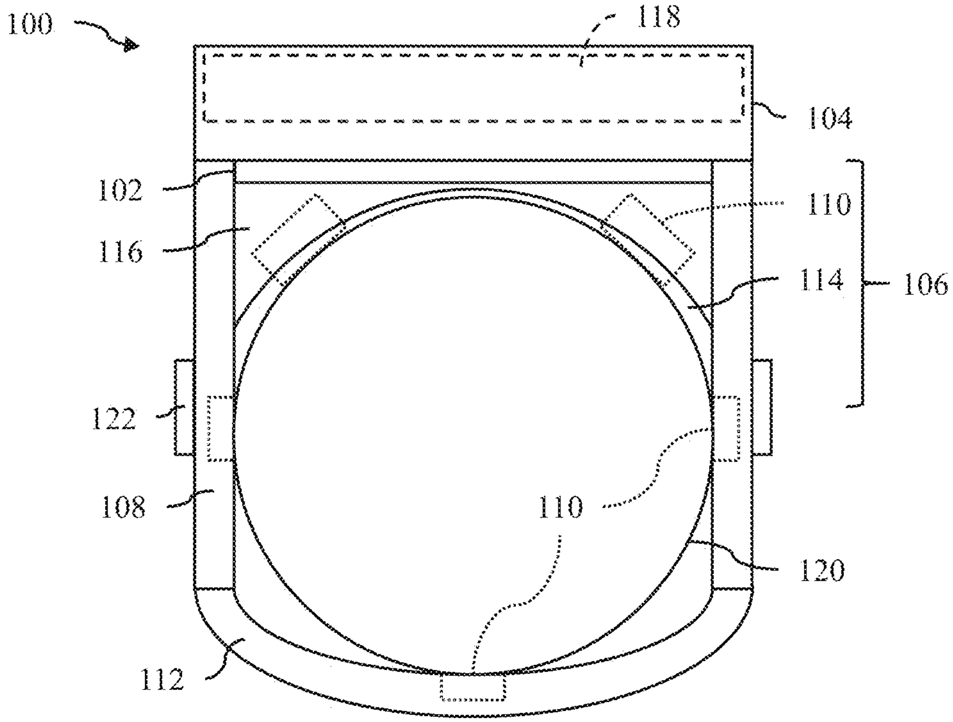
FIG. 1B is a top view of a head-mountable device.
Figure 1C:
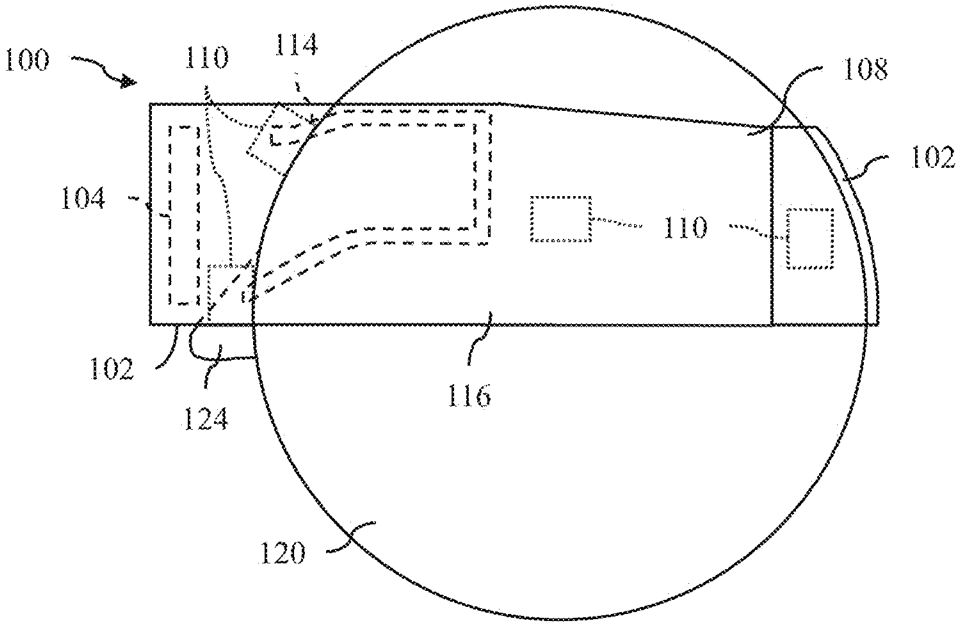
FIG. 1C is a side view of a head-mountable device.

FIG. 1A illustrates a block diagram of a head-mountable device (HMD) 100 including a frame 102, a display 104, a device seal 106, supports 108, sensors 110, and an adjustable band 112. FIGS. 1B and 1C illustrate a top-down view and a side view of the HMD 100, respectively. The display 104 can include one or more optical lenses or display screens 118 that are configured to be positioned in front of a user's eyes. The display 104 can be configured to present an augmented reality visualization, a virtual reality visualization, or another suitable visualization to the user. The display 104 can be positioned at least partially in or on the frame 102. The frame 102 can be a housing of the display 104. The device seal 106 can be physically coupled to the frame 102. In some examples, the device seal 106 includes the frame 102 (e.g., the frame 102 can be part of the device seal 106). The frame 102, the display 104, and the device seal 106 can collectively form a display housing.

The device seal 106 includes a facial interface frame 114, a cover 116, and electrical components (e.g., the sensors 110). The device seal 106 can also be referred to as a light seal. In some examples, the device seal 106 can refer to a portion of the HMD 100 that engages or shields the user's face. The device seal 106 can include portions of the HMD 100 that conform to, contact, or press against regions of the user's face (e.g., the facial interface frame 114). The facial interface frame 114 can conform to (e.g., compress against and assume the shape of) regions of the user's face. In some examples, the facial interface frame 114 can include pliant (or semi-pliant) materials that span a forehead region, wrap partially around the eyes, and contact the zygoma and maxilla regions of the user's face. As illustrated in FIGS. 1B and 1C, sensors 110 can be positioned in the facial interface frame 114, such as two sensors 110 being positioned in portions of the facial interface frame 114 configured to be adjacent to the user's forehead region and two sensors 110 being positioned in portions of the facial interface frame 114 configured to be adjacent to the user's zygoma and/or maxilla regions. Any number of the sensors 110 can be positioned in the facial interface frame 114, in any desired positions.

The supports 108 and/or the adjustable band 112 can retain the HMD 100 relative to a user's head 120. The supports 108 can be connected to the display 104 and can extend distally toward a rear of the user's head 120. In some examples, the supports 108 can be extensions of the display housing, such as the display 104. The supports 108 can be coupled to left and right sides of the display 104 to physically and/or electrically couple the supports 108 to the display 104. The supports 108 can be formed from rigid materials, such as rigid polymers and/or other materials. The supports 108 can contain sensors, buttons, speakers, and/or other electrical components. Hinges and/or other mechanisms can be used to couple the supports 108 to the display 104. In some examples, the supports 108 can be formed integrally as portions of the display 104.

The supports 108 and/or the adjustable band 112 can be configured to secure the display 104 in a position relative to the user's head (e.g., such that the display 104 is maintained in front of the user's eyes). In the example illustrated in FIG. 1B, the supports 108 can extend over the user's ears 122. In some examples, the supports 108 can rest on the user's ears 122 to secure the HMD 100 via friction between the supports 108 and the user's head 120. For example, the supports 108 can apply opposing pressures to the sides of the user's head 120 to secure the HMD 100 to the user's head 120. In some examples, the adjustable band 112 can extend over or around the user's ears 122, and can apply pressure to any combination of the front, the back, and/or the sides of the user's head 120 and/or the user's ears 122. As illustrated in FIG. 1C, the display 104 can extend over the user's nose 124. In some examples, the display 104 can rest on the user's nose 124 to secure the HMD 100 via friction between the display 104 and the user's head 120. As illustrated in FIGS. 1B and 1C, sensors 110 can be positioned in the supports 108, such as a sensor 110 being positioned in portions of each of the supports 108 configured to be adjacent to the user's ears. As illustrated in FIGS. 1B and 1C, sensors 110 can be positioned in the adjustable band 112, such as two sensors 110 being positioned in portions of the adjustable band 112 configured to be adjacent to a backside of the user's head 120. Any number of the sensors 110 can be positioned in the supports 108 and/or the adjustable band 112, in any desired positions.

The adjustable band 112 can have first and second ends that are physically coupled to the supports 108, and the supports 108 can be coupled to left and right sides of the display 104. The first and second ends of the adjustable band 112 can have coupling mechanisms, such as openings, that are configured to receive posts or other protrusions of the supports 108 (or other coupling structures of the display housing), or the supports 108 can have coupling mechanisms, such as openings, that are configured to receive posts or other protrusions of the adjustable band 112. The adjustable band 112 can be coupled to the supports 108 such that a user removably attaches the adjustable band 112 to the supports 108. As such, the user can remove the adjustable band 112 from the supports 108. The supports 108 can have elongated shapes, as illustrated in FIGS. 1B and 1C, and/or other suitable shapes. Examples of the supports 108 can include rigid straps, rigid coupling members, power straps, or the like. In some examples, the adjustable band 112 can be fixedly attached to the supports 108, without being removable from the supports 108.

The HMD 100 can be worn on the user's head 120 such that the display 104 is positioned on the user's face and disposed in front of one or both of the user's eyes. The display 104 can be physically coupled to the supports 108, the adjustable band 112, and/or the device seal 106. In some examples, the adjustable band 112 can be positioned against sides of the user's head 120 and in contact therewith, against a back surface of the user's head 120 and in contact therewith, or the like. In some examples, the adjustable band 112 and/or the supports 108 can be at least partially positioned above the user's ears 122. In some examples, the adjustable band 112 and/or the supports 108 can be positioned adjacent to the user's ears 122. The supports 108 and the adjustable band 112 can extend around the user's head 120. In this way, the display 104, the device seal 106, the supports 108, and the adjustable band 112 can form a loop configured to retain the HMD 100 on the user's head 120. It should be understood, however, that this configuration is just one example of how the components of the HMD 100 can be arranged. In some examples, a different number of connector straps and/or retention bands can be included. Although the HMD 100 is referred to as an HMD, it should be understood that the terms wearable device, wearable electronic device, HMD device, and/or HMD system can be used to refer to any wearable device, including smart glasses.

The adjustable band 112 can include a tension adjustment system that adjusts tension in the adjustable band 112. Once the HMD 100 is donned by a user, the user can use the tension adjustment system to adjust tension in the adjustable band 112, and adjust the tightness of the HMD 100. Tension in the tension adjustment system can be altered through an adjustment dial, a rack and pinion system, a gear-driven system, or the like. In some examples, the tension adjustment system can include cables in the adjustable band 112 that are wound or unwound to adjust tension in the adjustable band 112. The tension adjustment system can be a manual system that is adjusted by the user of the HMD 100. The HMD 100 can provide prompts through the display 104, speakers, or the like for the user to adjust the tension adjustment system. The tension adjustment system can be an automatic system that is adjusted by motors or the like controlled by the HMD 100. The adjustable band 112 can include elastic portions that stretch and aid in donning and doffing the HMD 100.

The sensors 110 can be included in the HMD 100 to provide the HMD 100 with feedback reflecting forces present between the HMD 100 and the user's head 120, a current position of the HMD 100 relative to the user's head 120, a current position of the HMD 100 relative to the earth (e.g., orientation), movement of the HMD 100 (e.g., velocity and/or acceleration), and the like. For example, the sensors 110 can provide the HMD 100 with feedback reflecting forces applied by the HMD 100, such as forces applied through the adjustable band 112, the supports 108, and the facial interface frame 114 to the user's head 120. The sensors 110 can provide the HMD 100 with feedback reflecting alignment of the HMD 100 relative to the user's eyes or other landmarks on the user's face. The sensors 110 can provide the HMD 100 with feedback reflecting the position of the HMD 100 relative to the earth, such as the orientation of the HMD 100 in a vertical position, a horizontal position, any position between vertical and horizontal, or the like relative to the earth. The sensors 110 can provide the HMD 100 with feedback reflecting movement of the HMD 100, such as linear and/or angular velocity and/or acceleration. The sensors 110 can provide the HMD 100 with feedback reflecting any other relevant metrics that effect comfort, fit, and alignment of the HMD 100.

In examples in which the sensors 110 provide feedback reflecting forces between the HMD 100 and the user's head 120, the sensors 110 can include force transducers, load cells, force sensors, pressure sensors, or the like. The sensors 110 can convert an input mechanical load, weight, tension, compression or pressure into a force signal. The force signal can be sent to a processor of the HMD 100, and can be compared to a prescribed range of values for the force between the HMD 100 and the user's head 120. The prescribed range can be based on user preferences, a type of activity performed while using the HMD 100 (referred to as an activity type), a duration for which the HMD 100 has been or is expected to be used, or the like. The HMD 100 can adjust tension in the adjustable band 112, or provide instructions to a user of the HMD 100 through the display 104, speakers of the HMD 100, or the like to adjust tension in the adjustable band 112 in response to the force signal from the sensors 110.

In examples in which the sensors 110 provide feedback reflecting the position of the HMD 100 relative to the user's head 120, the sensors 110 can include optical sensors, such as cameras or the like. The sensors 110 can produce an HMD position signal (also referred to as an image signal), which can be analyzed by a processor of the HMD 100 in order to detect landmarks on a user's face. The HMD 100 can determine alignment of the HMD 100 relative to the user's face based on the detected landmarks. The HMD 100 can provide instructions to a user of the HMD 100 through the display 104, speakers of the HMD 100, or the like to adjust the position of the HMD 100 relative to the user's face based on any detected misalignment between the HMD 100 and the user's face. In some examples, the HMD 100 can include motors configured to automatically alter a position of the display 104 in response to any detected misalignment.

In some examples, the adjustable band 112 can include multiple tension adjustment systems, which can be automatically adjusted to alter the position of the HMD 100 relative to the user's head 120. For example, the adjustable band 112 can include separate left and right tension adjustment systems that can be used to adjust the yaw of the HMD 100. In other words, the adjustable band 112 can move the display 104 of the HMD 100 to the left or right relative to the user's eyes. The adjustable band 112 can include an over-the-head adjustable band with separate left and right tension adjustment systems that can be used to adjust the roll of the HMD 100. In other words, the adjustable band 112 can angle the display 104 of the HMD 100 relative to an axis between the display 104 and the user's eyes. The facial interface frame 114 can include motors that can be used to adjust the pitch of the HMD 100. In other words, the facial interface frame 114 can tilt the display 104 of the HMD 100 relative to an axis parallel to the display 104.

In examples in which the sensors 110 provide feedback reflecting an orientation, position, velocity, or acceleration of the HMD 100, the sensors 110 can include inertial measurement units (IMUs). The sensors 110 can produce IMU signals, which can be analyzed by a processor of the HMD 100 in order to determine linear and/or angular velocity, acceleration, rate, and/or orientation of the HMD 100. The IMU signals can be used to determine a type of activity performed while using the HMD 100, or an activity level for the HMD 100. For example, the processor can analyze the IMU signals to determine that the HMD 100 is being used for a dynamic activity (e.g., an exercise routine), a static activity (e.g., watching a movie or reading a book), or the like. The HMD 100 can adjust tension in the adjustable band 112, or provide instructions to a user of the HMD 100 through the display 104, speakers of the HMD 100, or the like to adjust tension in the adjustable band 112 in response to the activity level detected by from the sensors 110. The sensors 110 can also detect orientation of the HMD 100, which can cause uneven forces to be applied to the HMD 100. For example, a force may be applied to one side of the HMD 100 when a user is lying on their side. These uneven forces can be counteracted by altering tension in specific areas of the adjustable band 112, by a user in response to prompts from the HMD 100, or automatically by the HMD 100 through motors or the like.

In some examples, the sensors 110 can be dual- or multi-purpose sensors. For example, the sensors 110 can be force transducers that can be used to detect forces between the HMD 100 and the user's head 120 for both the fit of the HMD 100, and to collect health data of the user. Similarly, in examples in which the sensors 110 are optical sensors, IMUs, or the like, the sensors 110 can collect health characteristics data of the user in addition to the previously described functions of the sensors 110. Providing multi-purpose sensors 110 in the HMD 100 can limit the number of sensors provided in the HMD 100.

The sensors 110 can be placed in any desired positions in the HMD 100. In some examples, the sensors 110 can be placed in contact areas between the HMD 100 and the user's head 120, which can be used to measure force between the HMD 100 and the user's head 120. For example, the sensors 110 can be placed in the facial interface frame 114, such as in areas of the facial interface frame 114 configured to be adjacent to a forehead location, a zygoma location, and/or a maxilla location of the user's head 120. The sensors 110 can be placed in the supports 108, such as in areas of the supports 108 configured to be adjacent to the user's ears 122. The sensors 110 can be placed in the adjustable band 112, such as in areas of the adjustable band 112 configured to be adjacent to the user's head 120. The sensors 110 can be placed in areas of the HMD 100 configured to be adjacent to landmarks on the user's head, which can be used to align the display 104 of the HMD 100 with the user's eyes. For example, the sensors 110 can be placed in areas of the HMD 100 configured to be adjacent to the user's eyes, the user's nose 124, the user's eyebrows, or any other features of the user's head with features that can act as landmarks for aligning the HMD 100 with the user's head 122.

The HMD 100 can make automatic adjustments or provide instructions for user adjustments, such as to tension in the adjustable band 112, based on signals provided by the sensors 110 and characteristics of a user's use of the HMD 100. The characteristics can include user preferences, activity types for which the HMD 100 is used, a duration for which the HMD 100 has been and/or is expected to be used, and the like. For example, some users can prefer the HMD 100 to be tighter, while other users can prefer the HMD 100 to be looser. The HMD 100 can track identities of various users and analyze force signals for the users generated by the sensors 110, such as after the users adjust tension in the adjustable band 112, in order to track and determine user preferences for tightness of the HMD 100. The HMD 100 can determine an activity type based on activities selected by a user and analysis of position signals generated by the sensors 110. The HMD 100 can adjust the tension in the adjustable band 112 to fit tighter (e.g. have higher tension settings) for dynamic activities, and to fit looser (e.g. have lower tension settings) for static activities. The HMD 100 can track a duration of use of the HMD 100 and predict an expected duration of use of the HMD 100 based on activities selected by the user, historical duration data related to the user, and the like. The HMD 100 can adjust the tension in the adjustable band 112 to fit tighter (e.g. have higher tension settings) for longer durations of use, to fit looser (e.g. have lower tension settings) for shorter durations of use, can cycle the tightness of the adjustable band 112 throughout use, or the like. The HMD 100 can adjust tension settings for the adjustable band 112, automatically or through instructions provided to the user, based on any of the use characteristics of the HMD 100.

The combination of the sensors 110 and the adjustable band 112 can be provided to improve comfort, fit, and alignment of the HMD 100 relative to the user's head 120. Specifically, HMD 100 can correct alignment or instruct the user to correct alignment of the HMD 100 relative to the user's head 120 based on signals generated by the sensors 110. The HMD 100 can also adjust tension settings of the adjustable band 112 to adjust the tightness of the adjustable band 112 based on signals generated by the sensors 110, which can be used in combination with use characteristics for the HMD 100.

In some examples, the HMD 100 can include other structures (e.g., an optional over-the-head band or the like) to help hold the HMD 100 on the user's head 120. The sensors 110 and/or tension adjustment systems can be included in any or all of the structures used to hold the HMD 100 on the user's head 120. Including the sensors 110 and/or tension adjustment systems in multiple structures that hold the HMD 100 on the user's head 120 can provide adjustments to the tension and/or position of the HMD 100 on the user's head 120 in multiple dimensions, which can further improve comfort, alignment, and the like of the HMD 100 relative to the user's head 120.

As used herein, the term "forehead region" refers to an area of a human face between the eyes and the scalp of a human. Additionally, the term "maxilla region" refers to an area of a human face corresponding to the zygomatic bone structure of a human. Similarly, the term "maxilla region" refers to an area of a human face corresponding to the maxilla bone structure of a human. Further, the term "temple region" refers to an area of a human face between a respective eye and ear on a particular side of a face (e.g., between cheek bones and a forehead region).

Figure 2:
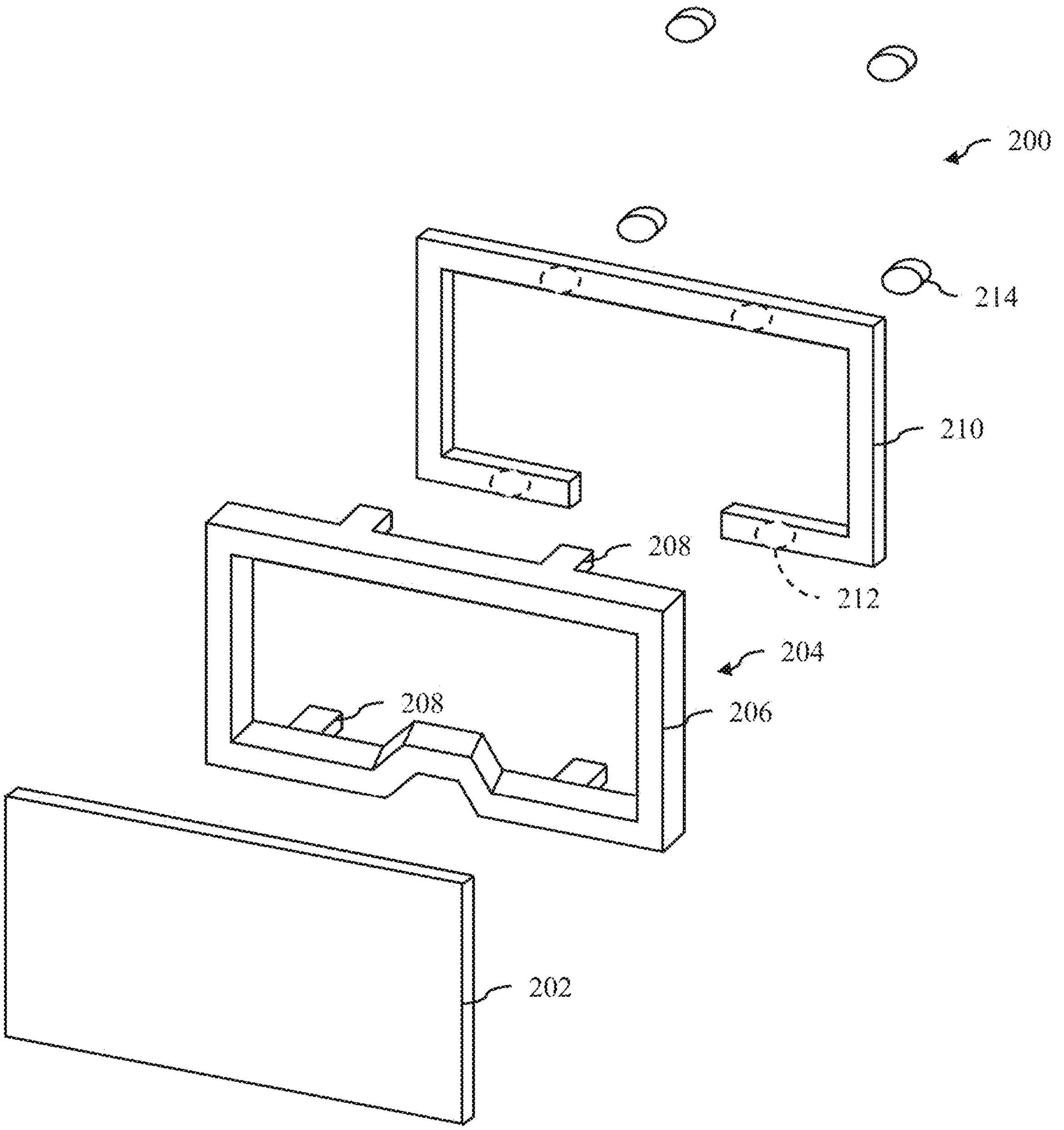
FIG. 2 is an exploded view of a display portion of a head-mountable device.

FIG. 2 illustrates an exploded view of a display housing 200. The display housing 200 includes a display 202, a facial interface frame 204, a base or face engagement portion or light seal 210, and sensors 214. The display 202, the facial interface frame 204, and the sensors 214 can be substantially similar to, including some or all of the features of the display 104, the facial interface frame 114, and the sensors 110, respectively, of FIGS. 1A through 1C. The display housing 200 can be implemented on an HMD, such as the HMD 100 described in reference to FIGS. 1A through 1C.

The facial interface frame 204 can include a frame 206 and connectors 208. The frame 206 can be physically coupled to the display 202, and the frame 204 can be configured provide an interface between the display 202 and the facial interface frame 204. The base 214 can be configured provide an interface between the facial interface frame 204 and a user's face. The connectors 208 can be configured to provide a desired distance between the display 202 and a user's eyes when the HMD is donned by the user. The connectors 208 and/or the base or face engagement portion 210 can include attachment mechanisms that are used to attach the facial interface frame 204 to the face engagement portion 210.

The sensors 214 can be positioned in the base or face engagement portion 210 adjacent the connectors 208 of the facial interface frame 204. The connectors 208 can apply pressure to a user's face through the base or face engagement portion 210 when an HMD including the display housing 200 is donned. Thus, portions of the base or face engagement portion 210 adjacent the connectors 208 can have good contact with the user's face. In the example of FIG. 2, the two upper connectors 208 can be configured to be adjacent to a user's forehead region, and the two lower connectors 208 can be configured to be adjacent to a user's zygoma and/or maxilla regions. The base or face engagement portion 210 can include openings 212 in which the sensors 214 can be positioned, in which the connectors 208 can be positioned, or a combination thereof. Positioning the sensors 214 adjacent to the connectors 208 can ensure that the sensors 214 are in positions that will contact a user's face, such as in a forehead region, a zygoma region, and/or a maxilla region. This aids the sensors 214 in obtaining accurate measurements of the interaction between the HMD and the user's face, which further improves fit, comfort, and alignment between the HMD and the user's face. Although two upper connectors 208, two lower connectors 208, and four sensors 214 are discussed in the example of FIG. 2, any number of connectors 208 and sensors 214 can be included, in any desired positions, and the connectors 208 and sensors 214 can be in different positions relative to one another.

Figure 3:
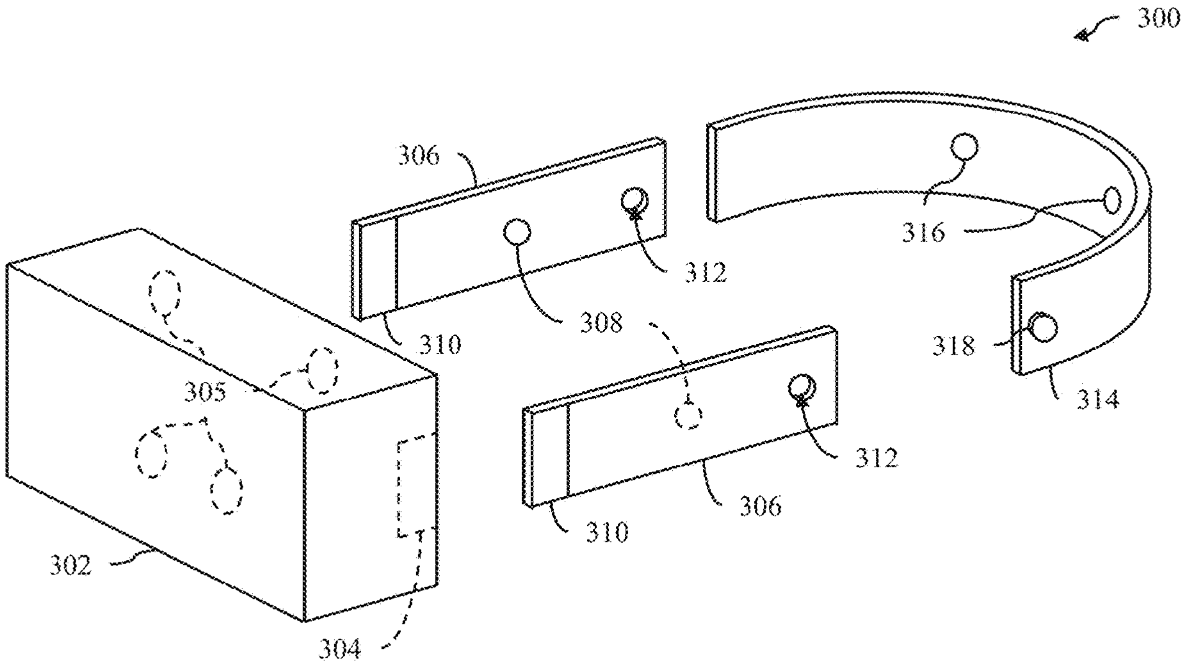
FIG. 3 is an exploded view of a head-mountable device.

FIG. 3 illustrates an exploded view of an HMD 300, including the locations of sensors on the various components, as described herein. The HMD 300 can include a display housing 302, supports 306, and an adjustable band 314. The HMD 300, the supports 306, and the adjustable band 314 can be substantially similar to, including some or all of the features of the HMD 100, the supports 108, and the adjustable band 112, respectively, of FIGS. 1A through 1C. The display housing 302 can be substantially similar to, including some or all of the features of the display housing 200 of FIG. 2. The display housing 302 can include display sensors 305, the supports 306 can include support sensors 308, and the adjustable band 314 can include band sensors 316. Any of the display sensors 305, the support sensors 308, and/or the band sensors 316 can include force sensors (e.g., force transducers), optical sensors (e.g., cameras), inertial measurement units, combinations or multiples thereof, or the like. The display sensors 305, the support sensors 308, and the band sensors 316 can be substantially similar to, including some or all of the features of the sensors 110 of FIGS. 1A through 1C.

The supports 306 can include connectors 310 and openings 312. The connectors 310 can be referred to as housing connectors, HMD connectors, or the like, and can be physically and/or electrically coupled to the display housing 302. The connectors 310 can provide electrical communication between the supports 306 and the display housing 302 by removably or releasably attaching to a corresponding connector 304 on the display housing 302. As used herein, providing electrical communication between two elements can include providing any type of electrical signal including power and/or data. Additionally, in some examples, an intermediate component can include conductive elements that are in electrical communication with two or more components and can transmit an electrical signal from one component to another. In other words, multiple components can be in electrical communication with one another, including components that conduct electrical signals, and not just components that are transmitting or receiving the electrical signals.

The adjustable band 314 can include protrusions 318. The protrusions 318 can be received in the openings 312 in the supports 306 in order to physically couple the adjustable band 314 to the supports 306. In some examples, the supports 306 can include protrusions, and the adjustable band 314 can include corresponding openings for receiving the protrusions. In some examples, the supports 306 can include connectors and the adjustable band 314 can include corresponding connectors, which can provide electrical communication between the supports 306 and the adjustable band (such as between the supports 306 and the band sensors 316).

In the example of FIG. 3, four of the display sensors 305 are positioned in the display housing 302, two of the support sensors 308 are positioned in the supports 306, and two of the band sensors 316 are positioned in the adjustable band 314. The display sensors 305 can be positioned in locations of the display housing 302 configured to be adjacent to a user's forehead region, zygoma region, and/or maxilla region. The support sensors 308 can be positioned in locations of the supports 306 configured to be adjacent to a user's ears. The band sensors 316 can be positioned in locations of the adjustable band 314 configured to be adjacent to a backside of a user's head. Although four display sensors 305, two support sensors 308, and two band sensors 316 are discussed in the example of FIG. 3, any number of the display sensors 305, the support sensors 308, and the band sensors 316 can be included, in any desired positions. The display sensors 305, the support sensors 308, and the band sensors 316 can be provided to measure pressure and alignment in various positions around the HMD 300 such that the HMD 300 can be adjusted to improve fit, comfort, and alignment of the HMD 300 relative to a user's head.

Figure 4:
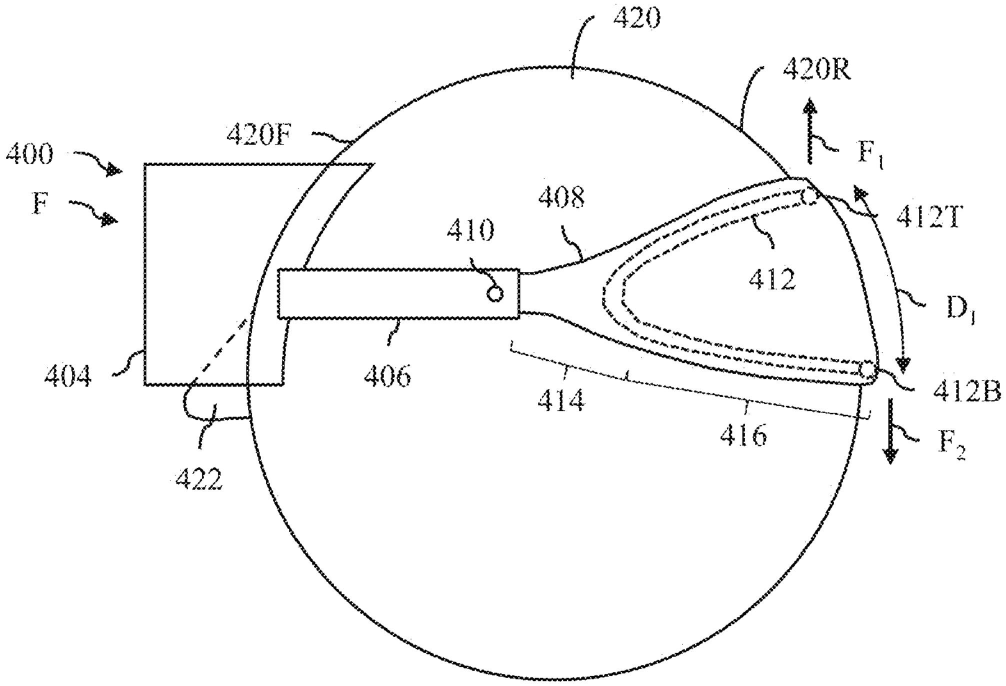
FIG. 4 is a side view of a head-mountable device including an adjustable headband.

FIG. 4 illustrates a side view of an HMD 400 with an adjustable band 408. The HMD 400 and the adjustable band 408 can be substantially similar to, including some or all of the features of the HMD 100 and the adjustable band 112, respectively, of FIGS. 1A through 1C. The HMD 400 can further include a display housing 404 and supports 406. The display housing 404 can include a main housing, a main housing unit, a head-mountable support structure, or the like. In some examples, display housing 404 can include forward-facing components, such as cameras, other sensors, and the like on a front-side F of the display housing 404. The forward-facing components can be used for gathering sensor measurements and other inputs. A soft cushion can be disposed on an opposing rear side of the display housing 404. In some examples, sensors can be positioned in the cushion in order to detect forces between the display housing 404 and a user's head 420, alignment, and the like. The rear side of the display housing 404 can include openings that allow the user to view images from the left and right optical systems (e.g., when the rear of the display housing 404 is resting on a front surface 420F of the user's head 420).

The HMD 400 includes the adjustable band 408 for adjusting tension applied to the user's head 420 (e.g., a tightness of the HMD 400). In some examples, the HMD 400 can include other structures (e.g., an optional over-the-head band or the like) to help hold the display housing 404 on the user's head 420. The adjustable band 408 can have first and second ends that are physically coupled to left and right sides of the display housing 404, respectively. In the example illustrated in FIG. 4, supports 406, which serve as extensions of the display housing 404, are provided on the left and right sides of the display housing 404 to physically couple the adjustable band 408 to the display housing 404. The supports 406 can be formed from rigid materials, such as rigid polymers and/or other materials. The supports 406 can contain sensors, buttons, speakers, and/or other electrical components. Hinges and/or other mechanisms can be used to couple the supports 406 to the display housing 404. In some examples, the supports 406 can be formed integrally as portions of the display housing 404.

The first and second ends of the adjustable band 408 can have coupling mechanisms, such as openings, that are configured to receive posts or other protrusions 410 of the supports 406 (or other coupling structures of the display housing 404). The adjustable band 408 can be coupled to the supports 406 such that a user removably attaches the adjustable band 408 to the supports 406. As such, the user can remove the adjustable band 408 from the display housing 404. The supports 406 can have elongated shapes, as illustrated in FIG. 4, and/or other suitable shapes. Examples of the supports 406 can include rigid straps, rigid coupling members, power straps, or the like.

The adjustable band 408 can include a soft flexible portion, such as a central portion 416. The central portion 416 can be formed between two stiffer portions, such as end portions 414 on the left and right ends of the adjustable band 408 (e.g., the first and second ends of the adjustable band 408). The end portions 414 can be stiffened using embedded polymer stiffeners (e.g., single-layer or multi-layer polymer stiffening strips) and/or other stiffening members. The central portion 416 can be formed from a stretchable material such as stretchy fabric. In some examples, the central portion 416 can be formed from a band of flat knit fabric that includes stretchable strands of material (e.g., elastomeric strands) and/or which uses a stretchable fabric construction (e.g., a stretchable knit construction). The central portion 416 can include narrowed end portions, which can extend over stiffening members in the end portions 414. This can ensure that the adjustable band 408 has a uniform external appearance. Forming the central portion 416 of a stretchable material and including the central portion in the adjustable band 408 allows the adjustable band 408 be stretched along its length. This allows the length of the adjustable band 408 to be temporarily increased to help a user place the adjustable band 408 over the user's head 420 when a user is donning the HMD 400. When the adjustable band 408 is released, the stretchiness and the elastic nature of the central portion 416 of the adjustable band 408 help to shorten the adjustable band 408 and pull the adjustable band 408 against the user's head. This allows the adjustable band 408 to rest against a rear surface 420R the user's head.

A tensioning system (such as the tensioning systems 504, discussed below with respect to FIGS. 5A through 5E) can be included to provide further adjustment of the effective length and tension of the adjustable band 408 to secure the adjustable band 408 and the HMD 400 on the user's head 420. The tensioning system can be provided to adjust the effective length and tension in a band tensioning cable 412. The tensioning system can be a rotatable knob, lever, slider, or other mechanism for adjusting the band tensioning cable 412. In some examples, the tensioning system can include motors responsive to signals provided by the HMD 400. When the effective length of the band tensioning cable 412 is greater, or the tension lower, the adjustable band 408 will be looser. The increased effective length and low cable tension of the band tensioning cable 412 helps to create slack in the adjustable band 408, which can aid in donning and doffing of the HMD 400. When cable tension is increased, the adjustable band 408 is secured against the user's head 420.

As illustrated in FIG. 4, the band tensioning cable 412 can have a loop shape and can include an upper cable segment 412T that runs along an upper edge of the adjustable band 408 and an opposing lower cable segment 412B that runs along the opposing lower edge of the adjustable band 408. In the middle of the central portion 416 of the adjustable band 408, the upper and lower cable segments 412T and 412B can be separated by a distance $D_1$ (sometimes referred to as a cable bifurcation distance). The separation between the upper and lower cable segments 412T and 412B helps secure the adjustable band 408 on the curved rear surface 420R of the user's head 420. When the adjustable band 408 is worn on the rear surface 420R, as illustrated in FIG. 4, the upper cable segment 412T can apply an upward force $F_1$ on the adjustable band 408 that can prevent the adjustable band 408 and the display housing 404 from slipping downwards off of the user's head 420. Similarly, the lower cable segment 412B can apply a downward force $F_2$ that can prevent the adjustable band 408 and the display housing 404 from slipping upwards off of the user's head 420. In some examples, the display housing 404 can rest on a user's nose 422, and the supports 406 and/or the adjustable band 408 can rest on a user's ears, which can aid in preventing the HMD 400 from slipping downwards off of the user's head 420.

FIGS. 5A through 5E illustrate plan views of adjustable bands 500 including tensioning systems 504, in accordance with some examples. The adjustable bands 500 can be substantially similar to, and can include some or all of the features of the adjustable bands 112, 314, 408 discussed above with respect to FIGS. 1A through 4. As illustrated in FIGS. 5A through 5E, an adjustable band 500 can include a central portion 512 and end portions 510. As discussed above, the central portion 512 can be stretchable and can be formed from a stretchy knit fabric, and the end portions can be stiffened using stiffeners embedded in fabric. One or more openings 514 can be formed in the end portions 510 of the adjustable band 500. The openings 514 can receive posts or other protrusions. The openings 514 can be used in conjunction with the protrusions to secure the end portions 510 of the adjustable band 500 to supports of a display housing of an HMD. In some examples, a single opening 514 or other attachment mechanism can be disposed on each of the end portions 510 of the adjustable band 500. In some examples, each of the end portions 510 of the adjustable band 500 can include two or more of the openings 514. In some examples, other attachment mechanisms (e.g., magnets, snaps, hook-and-loop fasteners, screws or other fasteners, combinations thereof, or the like) can be used to attach the adjustable band 500 to the supports, or other portions of the display housing in an HMD.

Figure 5A:
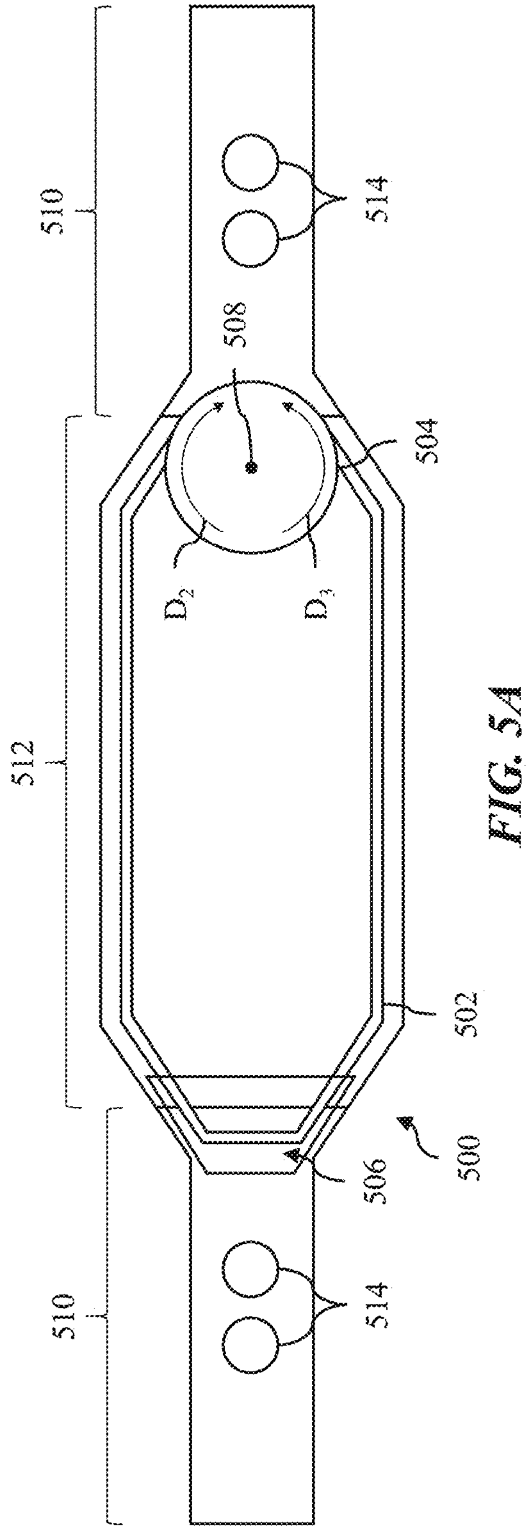
FIGS. 5A, 5B, 5C, 5D, and 5E are plan views of adjustable headbands.

In the example of FIG. 5A, the adjustable band 500 includes a band tensioning cable 502 extending in a loop around a perimeter of the central portion 512 of the adjustable band 500. The adjustable band 500 includes a pulley 506 coupled to a left end portion 510 of the adjustable band 500. The adjustable band 500 includes a tensioning system 504 coupled to a right end portion 510 of the adjustable band 500. In the example of FIG. 5A, the tensioning system 504 is an adjustment knob or dial. The adjustment knob/dial of the tensioning system 504 can be actuated by a user, or a motor that can actuate the adjustment knob/dial based on a signal from an HMD. The tensioning system 504 can be a two-way dial that can be rotated in a first direction $D_2$ about a rotational axis 508 (e.g., a clockwise direction) to shorten the length of the loop of the band tensioning cable 502 and thereby increase tension on the band tensioning cable 502. The length of the loop of the band tensioning cable 502 outside the tensioning system 504 and disposed in the central portion 512 can be referred to as the "effective length" of the band tensioning cable 502. The dial of the tensioning system 504 can be rotated in an opposing second direction $D_3$ about the rotational axis 508 (e.g., a counterclockwise direction) to increase the length of the loop of the band tensioning cable 502 and thereby decrease tension on the band tensioning cable 502. By tightening the band tensioning cable 502, tension in the adjustable band 500 can be increased and an HMD can be held more snugly on a user's head. The pulley 506 can be included to allow tension in upper and lower portions of the band tensioning cable 502 to be balanced, such that the adjustable band 500 applies consistent tension across various head shapes. By loosening the band tensioning cable 502, effective length can be increased and the tension in the adjustable band 500 can be decreased.

Figure 5B:
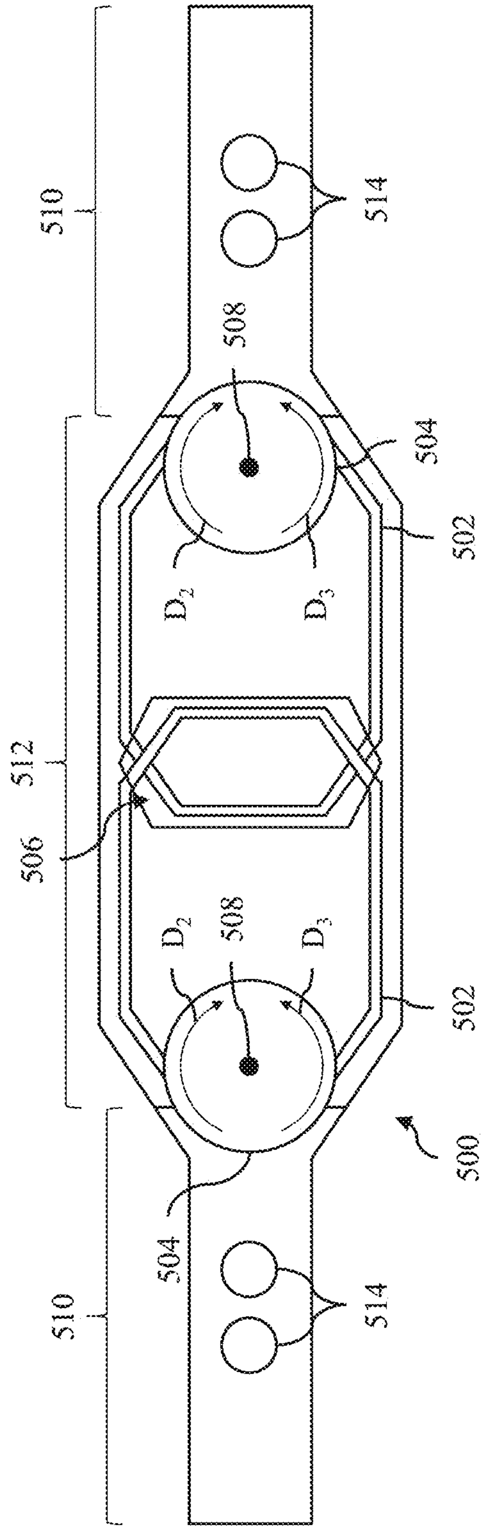

In the example of FIG. 5B, the adjustable band 500 includes two band tensioning cables 502, with each band tensioning cable extending in a loop around a portion of a perimeter of the central portion 512 of the adjustable band 500. The adjustable band 500 includes a pulley 506 coupled to the central portion 512 of the adjustable band 500. The adjustable band 500 includes two tensioning systems 504 coupled to a left end portion 510 and a right end portion 510 of the adjustable band 500. In the example of FIG. 5B, the tensioning systems 504 are adjustment knobs or dials. The adjustment knobs/dials of the tensioning system 504 can be actuated by a user, or a motor that can actuate the adjustment knobs/dials based on a signal from an HMD. Including two tensioning systems 504 and band tensioning cables 502 allows tension in left and right sides of the adjustable band 500 to be set separately.

Each of the tensioning systems 504 can be two-way dials that can be rotated in a first direction $D_2$ about a rotational axis 508 (e.g., a clockwise direction) to shorten the length of the loop of the band tensioning cable 502 and thereby increase tension on the band tensioning cable 502. The dial of the tensioning systems 504 can be rotated in an opposing second direction $D_3$ about the rotational axis 508 (e.g., a counterclockwise direction) to increase the length of the loop of the band tensioning cable 502 and thereby decrease tension on the band tensioning cable 502. By tightening the band tensioning cable 502, tension in the adjustable band 500 can be increased and an HMD can be held more snugly on a user's head. The pulley 506 can be included to allow tension in upper and lower portions of the band tensioning cable 502 to be balanced, such that the adjustable band 500 applies consistent tension across various head shapes. By loosening the band tensioning cable 502, effective length can be increased and the tension in the adjustable band 500 can be decreased.

Figure 5C:
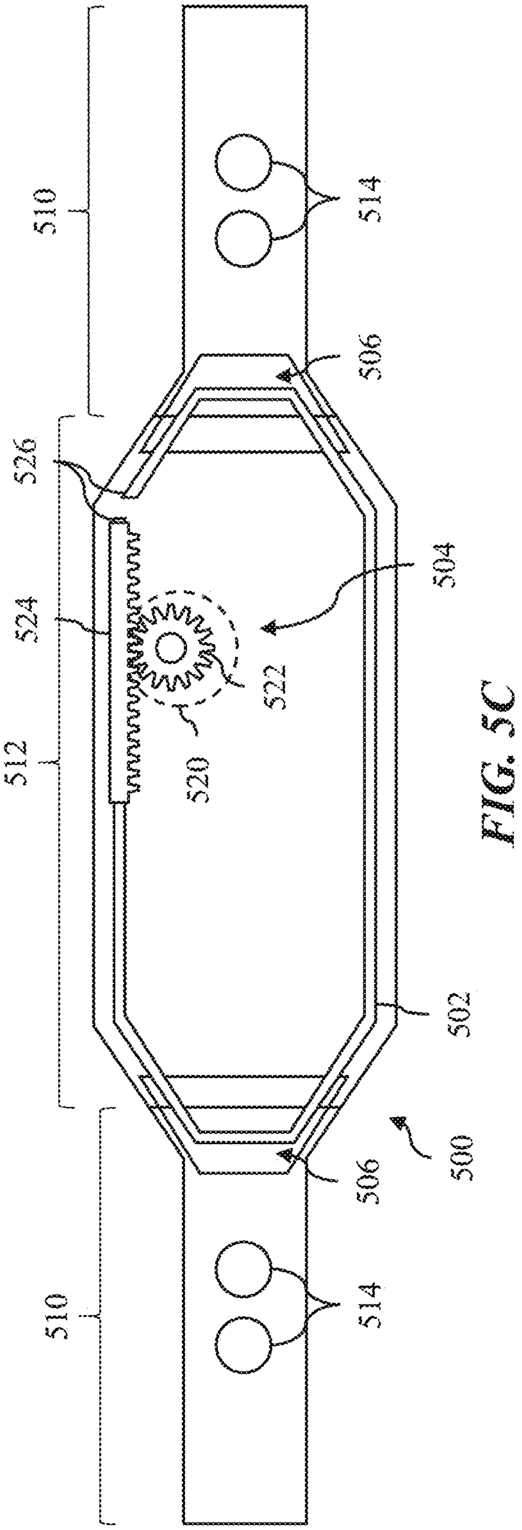

In the example of FIG. 5C, the adjustable band 500 includes a band tensioning cable 502 extending in a loop around at least a portion of a perimeter of the central portion 512 of the adjustable band 500. The adjustable band 500 includes two pulleys 506 coupled to left and right end portions 510 of the adjustable band 500. The adjustable band 500 includes a tensioning system 504 coupled to the central portion of the adjustable band 500. In the example of FIG. 5C, the tensioning system 504 is a rack and pinion system that includes a motor 520, a pinion 522, and a rack 524. The rack 524 can be connected to the band tensioning cable 502, and can have a longitudinal axis parallel to a longitudinal axis of the adjustable band 500. The motor 520 can rotate the pinion 522 along the rack 524 to shorten the length of the loop of the band tensioning cable 502 and thereby increase tension on the band tensioning cable 502, or increase the length of the loop of the band tensioning cable 502 and thereby decrease tension on the band tensioning cable 502. The band tensioning cable 502 can include a first end coupled to the rack 524 and a second end coupled to the central portion 512 of the adjustable band 500. In some examples, the motor 520 can be replaced by an adjustment knob or dial, and the tensioning system 504 can be actuated by a user. By tightening the band tensioning cable 502, tension in the adjustable band 500 can be increased and an HMD can be held more snugly on a user's head. The pulleys 506 can be included to allow tension in upper and lower portions of the band tensioning cable 502 to be balanced, such that the adjustable band 500 applies consistent tension across various head shapes. By loosening the band tensioning cable 502, effective length can be increased and the tension in the adjustable band 500 can be decreased.

Figure 5D:
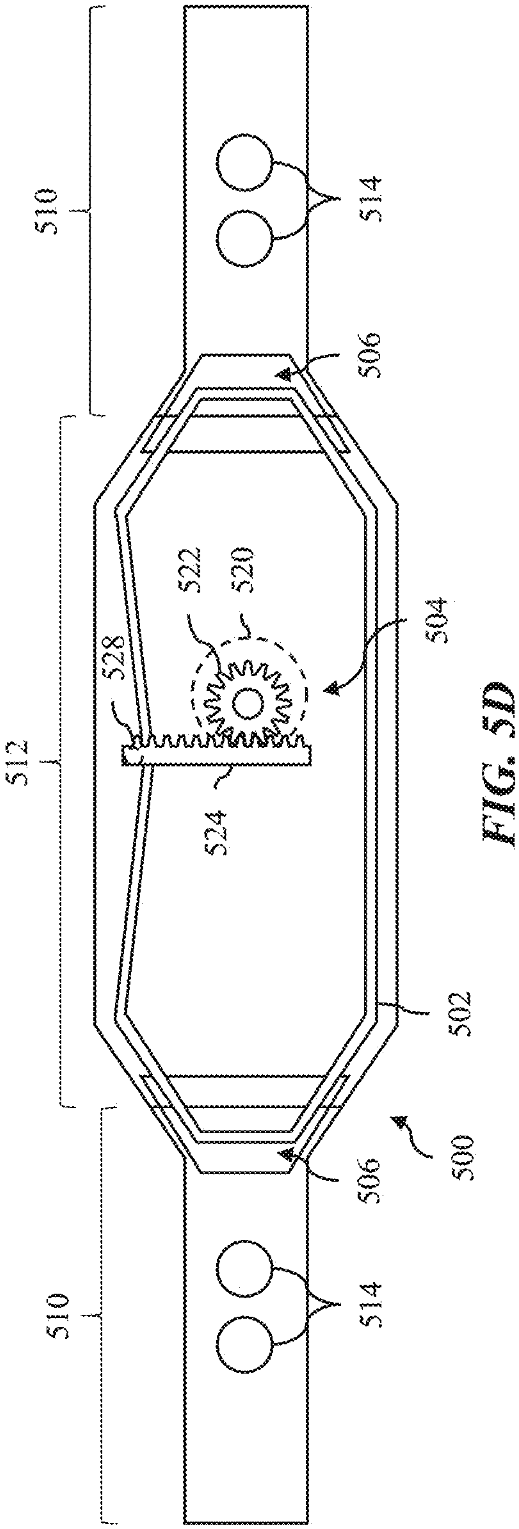

In the example of FIG. 5D, the adjustable band 500 includes a band tensioning cable 502 extending in a loop around a perimeter of the central portion 512 of the adjustable band 500. The adjustable band 500 includes two pulleys 506 coupled to left and right end portions 510 of the adjustable band 500. The adjustable band 500 includes a tensioning system 504 coupled to the central portion of the adjustable band 500. In the example of FIG. 5D, the tensioning system 504 is a rack and pinion system that includes a motor 520, a pinion 522, a rack 524, and a pulley 528. The band tensioning cable 502 can interact with the pulley 528 to define the loop of the band tensioning cable 502. The rack 524 can have a longitudinal axis perpendicular to a longitudinal axis of the adjustable band 500, and moving the rack 524 parallel to the longitudinal axis of the rack 524 can increase or decrease the length of the loop of the band tensioning cable. The motor 520 can rotate the pinion 522 along the rack 524 to shorten the length of the loop of the band tensioning cable 502 and thereby increase tension on the band tensioning cable 502, or increase the length of the loop of the band tensioning cable 502 and thereby decrease tension on the band tensioning cable 502. In some examples, the motor 520 can be replaced by an adjustment knob or dial, and the tensioning system 504 can be actuated by a user. By tightening the band tensioning cable 502, tension in the adjustable band 500 can be increased and an HMD can be held more snugly on a user's head. The pulleys 506 and 528 can be included to allow tension in upper and lower portions of the band tensioning cable 502 to be balanced, such that the adjustable band 500 applies consistent tension across various head shapes. By loosening the band tensioning cable 502, effective length can be increased and the tension in the adjustable band 500 can be decreased.

Figure 5E:
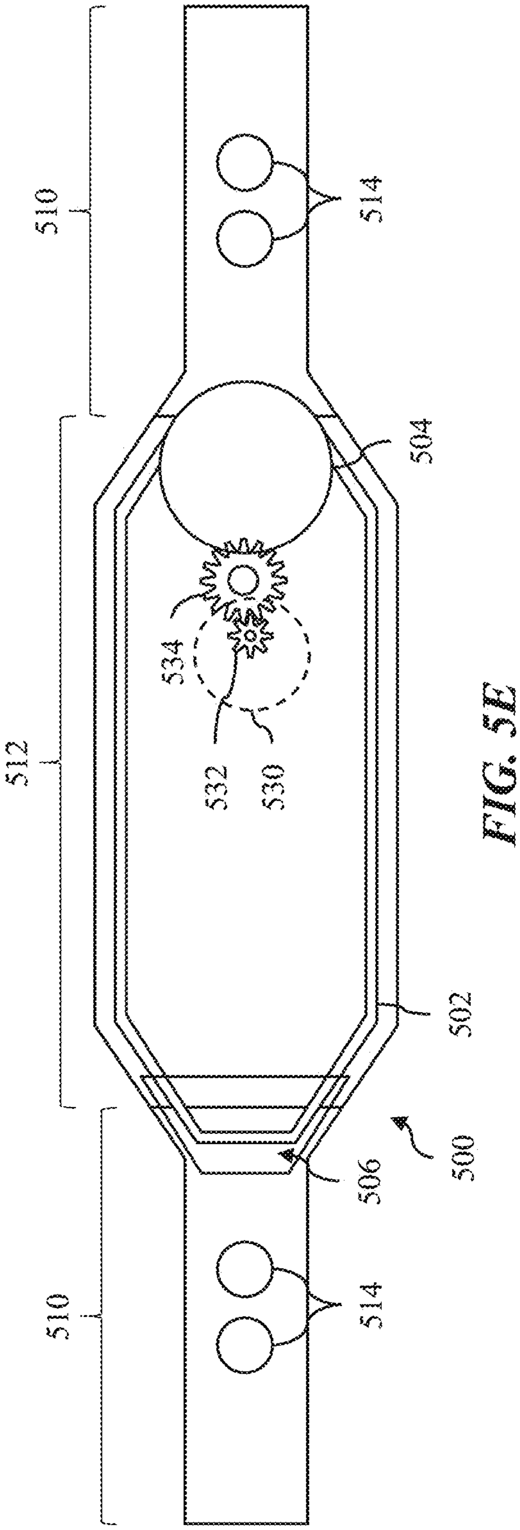

In the example of FIG. 5E, the adjustable band 500 includes a band tensioning cable 502 extending in a loop around a perimeter of the central portion 512 of the adjustable band 500. The adjustable band 500 includes a pulley 506 coupled to a left end portion 510 of the adjustable band 500. The adjustable band 500 includes a tensioning system 504 coupled to a right end portion 510 of the adjustable band 500. In the example of FIG. 5E, the tensioning system 504 is an adjustment knob or dial that is actuated by a motor 530 through gears 532, 534. The adjustment knob/dial of the tensioning system 504 can be actuated by the motor 530 through the gears 532, 534 based on a signal from an HMD. The tensioning system 504 can be a two-way dial that can be rotated to shorten the length of the loop of the band tensioning cable 502 and thereby increase tension on the band tensioning cable 502, or increase the length of the loop of the band tensioning cable 502 and thereby decrease tension on the band tensioning cable 502. By tightening the band tensioning cable 502, tension in the adjustable band 500 can be increased and an HMD can be held more snugly on a user's head. The pulley 506 can be included to allow tension in upper and lower portions of the band tensioning cable 502 to be balanced, such that the adjustable band 500 applies consistent tension across various head shapes. By loosening the band tensioning cable 502, effective length can be increased and the tension in the adjustable band 500 can be decreased.

FIGS. 5A through 5E illustrate various tension adjustment systems 504 that can be included in the adjustable band 500 to adjust tension in the adjustable band 500. The tension adjustment systems 504 can be actuated by a user, such as in response to instructions provided by an HMD or in response to user preferences, or actuated by the HMD. Multiple tension adjustment systems 504 can be included in a single adjustable band 500 in order to adjust tension in specific areas of the adjustable band 500, such as a left side, a right side, or the like.

Figure 6A:
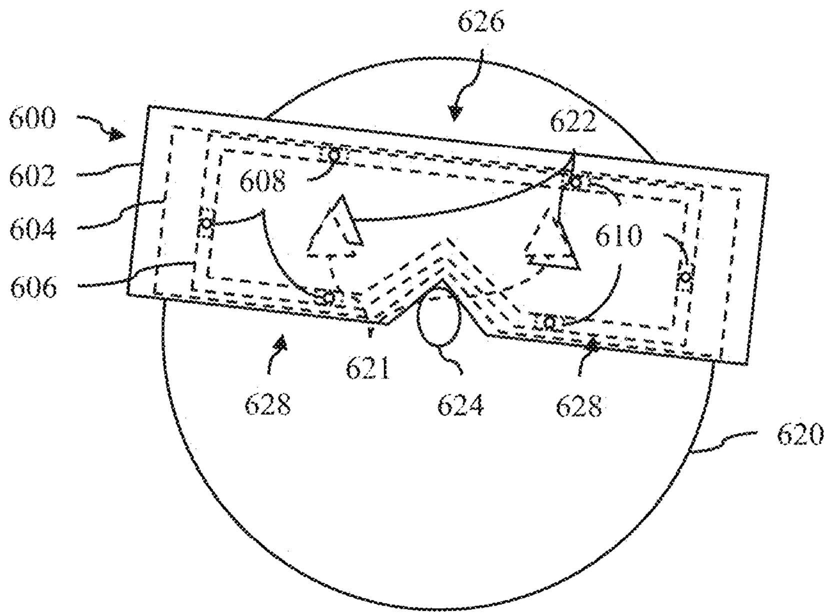
FIGS. 6A and 6B are front views of alignment of a head-mountable device.
Figure 6B:
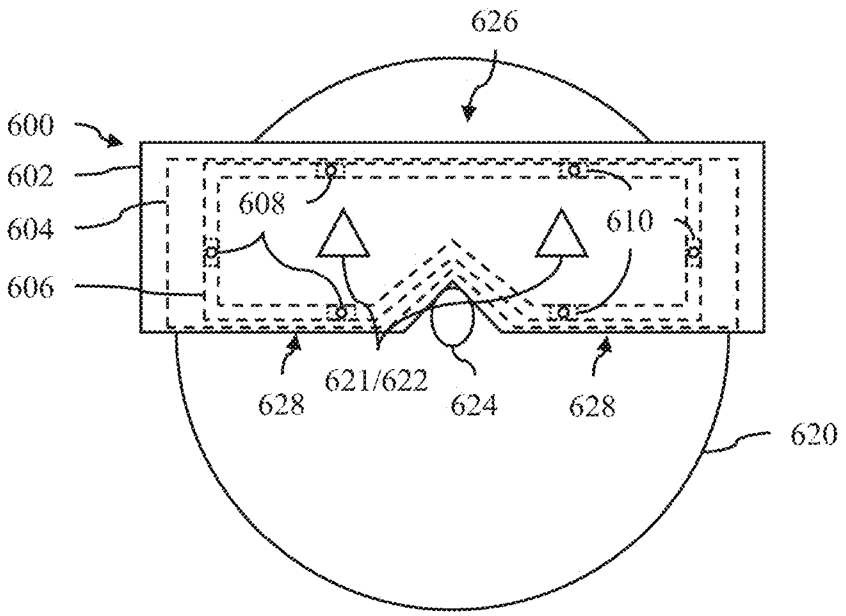

FIGS. 6A and 6B illustrate front views of a misalignment and re-alignment, respectively, of an HMD 600 relative to a user's head 620. The HMD 600 and components thereof can be substantially similar to, and can include some or all of the features of the HMDs 100, 300, and 400 discussed above with respect to FIGS. 1A through 1C, 3, and 4 and associated components discussed above with respect to FIGS. 1A through 5E. The HMD 600 includes a display housing 602, a display 604, and a facial interface frame 606. The facial interface frame 606 includes connectors 608 and sensors 610. The sensors 610 can be positioned adjacent to the connectors 608. The connectors 608 and the sensors 610 can be positioned adjacent to forehead regions 626 and maxilla/zygoma regions 628 of the user's head 620. The connectors 608 can apply pressure and ensure contact between the HMD 600 and the user's head 620, thus the sensors 610 can be positioned adjacent the connectors 608 to ensure contact between the sensors 610 and the user's head 620. FIGS. 6A and 6B illustrate 6 of the sensors 610 and 6 of the connectors 608, with two sensor sensor/connector pairs 608, 610 disposed adjacent the forehead region 628 and four sensor sensor/connector pairs 608, 610 disposed adjacent the maxilla/zygoma region 626. However, any number of the connectors 608 and the sensors 610 can be included, in any desired positions, and the connectors 608 and the sensors 610 can be in different positions relative to one another.

FIG. 6A illustrates a misalignment of the HMD 600 relative to the user's head 620, with actual eye positions 622 being spaced apart and rotated from aligned eye positions 621. The sensors 610 can detect landmarks or features of the user's face, determine the misalignment of the HMD 600 relative to the user's head 620, and provide the user with instructions to correct the misalignment of the HMD 600 relative to the user's head 620. For example, the sensors 610 can detect the user's cheek bones, nose 624, eyebrows, brow bone, or any other features of the user's face in order to determine the alignment of the HMD 600 relative to the user's head 620. The HMD 600 can then present the user with instructions to correct any misalignment, such as through the display 604, speakers, or the like. In some examples, the HMD 600 can include motors, such as in an adjustable band, which can be used to at least partially correct misalignments of the HMD 600 relative to the user's head 620. As a result, the configuration of FIG. 6B can be achieved in which the actual eye positions 622 are aligned with the aligned eye positions 621.

Figure 7:
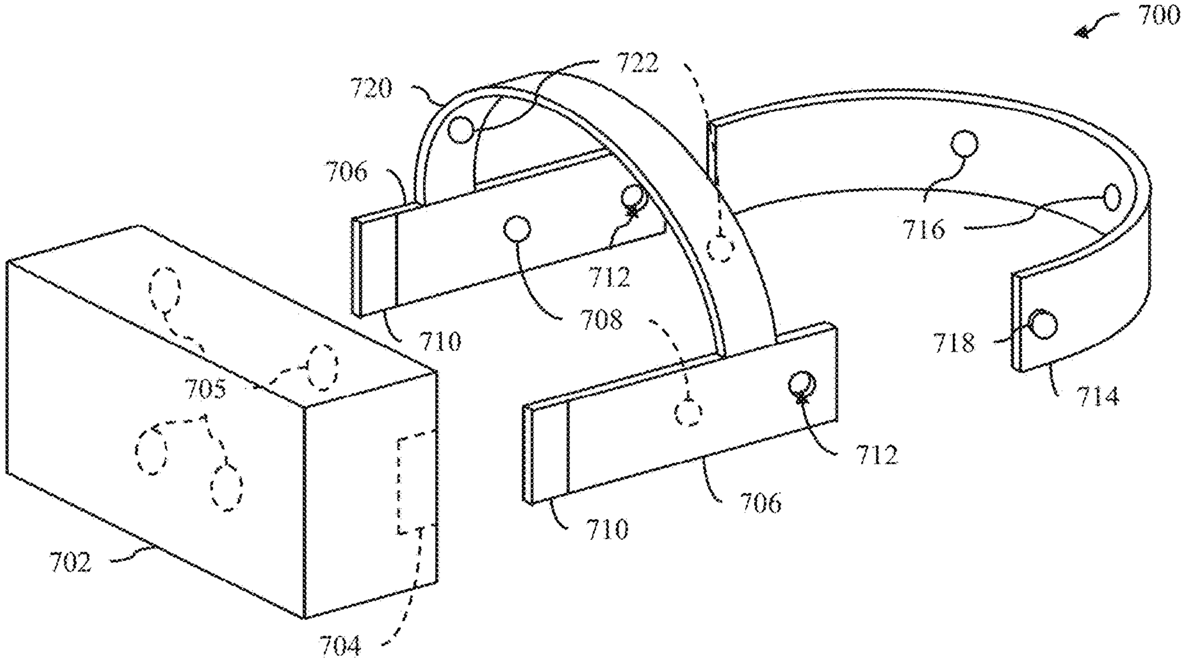
FIG. 7 is an exploded view of a head-mountable device.

FIG. 7 illustrates an exploded view of an HMD 700, including the locations of sensors on the various components, as described herein, and an over-the-head strap 720. The HMD 700 can include a display housing 702, supports 706, and an adjustable band 714. The HMD 700, the supports 706, and the adjustable band 714 can be substantially similar to, including some or all of the features of the HMD 100, the supports 108, and the adjustable band 112, respectively, of FIGS. 1A through 1C. The display housing 702 can be substantially similar to, including some or all of the features of the display housing 200 of FIG. 2. The display housing 702 can include display sensors 705, the supports 706 can include support sensors 708, the adjustable band 714 can include band sensors 716, and the over-the-head band 720 can include over-the-head sensors 722. Any of the display sensors 705, the support sensors 708, the band sensors 716, and/or the over-the-head sensors 722 can include force sensors (e.g., force transducers), optical sensors (e.g., cameras), inertial measurement units, combinations or multiples thereof, or the like. The display sensors 705, the support sensors 708, the band sensors 716, and the over-the-head sensors 722 can be substantially similar to, including some or all of the features of the sensors 110 of FIGS. 1A through 1C.

The supports 706 can include connectors 710 and openings 712. The connectors 710 can be referred to as housing connectors, HMD connectors, or the like, and can be physically and/or electrically coupled to the display housing 702. The connectors 710 can provide electrical communication between the supports 706 and the display housing 702 by removably or releasably attaching to a corresponding connector 704 on the display housing 702. As used herein, providing electrical communication between two elements can include providing any type of electrical signal including power and/or data. Additionally, in some examples, an intermediate component can include conductive elements that are in electrical communication with two or more components and can transmit an electrical signal from one component to another. In other words, multiple components can be in electrical communication with one another, including components that conduct electrical signals, and not just components that are transmitting or receiving the electrical signals.

The adjustable band 714 can include protrusions 718. The protrusions 718 can be received in the openings 712 in the supports 706 in order to physically couple the adjustable band 714 to the supports 706. In some examples, the supports 706 can include protrusions, and the adjustable band 714 can include corresponding openings for receiving the protrusions. In some examples, the supports 706 can include connectors and the adjustable band 714 can include corresponding connectors, which can provide electrical communication between the supports 706 and the adjustable band (such as between the supports 706 and the band sensors 716).

In the example of FIG. 7, the supports 706 can be releasably or permanently joined to one another, such as by an over-the-head strap 720. The over-the-head strap 720 can extend over a user's head when the HMD 700 is worn by a user. The over-the-head strap 720 can thus provide a secured and comfortable fit to the user. Further, in examples where the over-the-head strap 720 is removably or releasably attached to the supports 706, the user can opt whether or not to use the over-the-head strap 720 depending on the particular use scenario of the HMD 700. In some examples, the over-the-head strap 720 can include any material as desired, including polymeric materials, fabric materials, and any of the materials described with respect to supports, connectors, and/or adjustable bands.

In the example of FIG. 7, four of the display sensors 705 are positioned in the display housing 702, two of the support sensors 708 are positioned in the supports 706, two of the band sensors 716 are positioned in the adjustable band 714, and two of the over-the-head sensors 722 are positioned in the over-the-head band 720. The display sensors 705 can be positioned in locations of the display housing 702 configured to be adjacent to a user's forehead region, zygoma region, and/or maxilla region. The support sensors 708 can be positioned in locations of the supports 706 configured to be adjacent to a user's ears. The band sensors 716 can be positioned in locations of the adjustable band 714 configured to be adjacent to a backside of a user's head. The over-the-head sensors 722 can be positioned in locations of the over-the-head band 720 configured to be adjacent to a top of a user's head. Although four display sensors 705, two support sensors 708, two band sensors 716, and two over-the-head sensors 722 are discussed in the example of FIG. 7, any number of the display sensors 705, the support sensors 708, the band sensors 716, and over-the-head sensors 722 can be included, in any desired positions. The display sensors 705, the support sensors 708, the band sensors 716, and over-the-head sensors 722 can be provided to measure pressure and alignment in various positions around the HMD 700 such that the HMD 700 can be adjusted to improve fit, comfort, and alignment of the HMD 700 relative to a user's head.

Figure 8A:
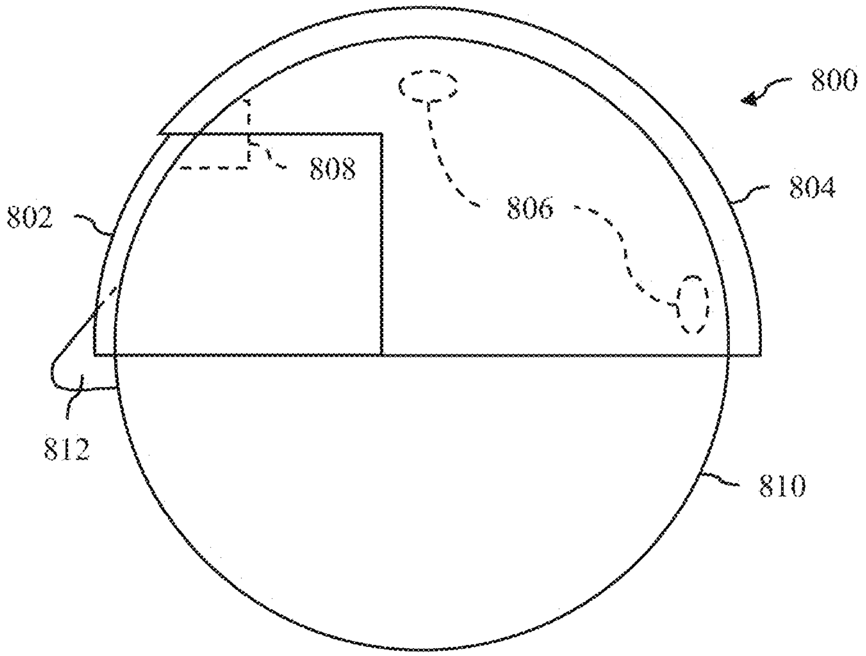
FIG. 8A is a side view of a head-mountable device.
Figure 8B:
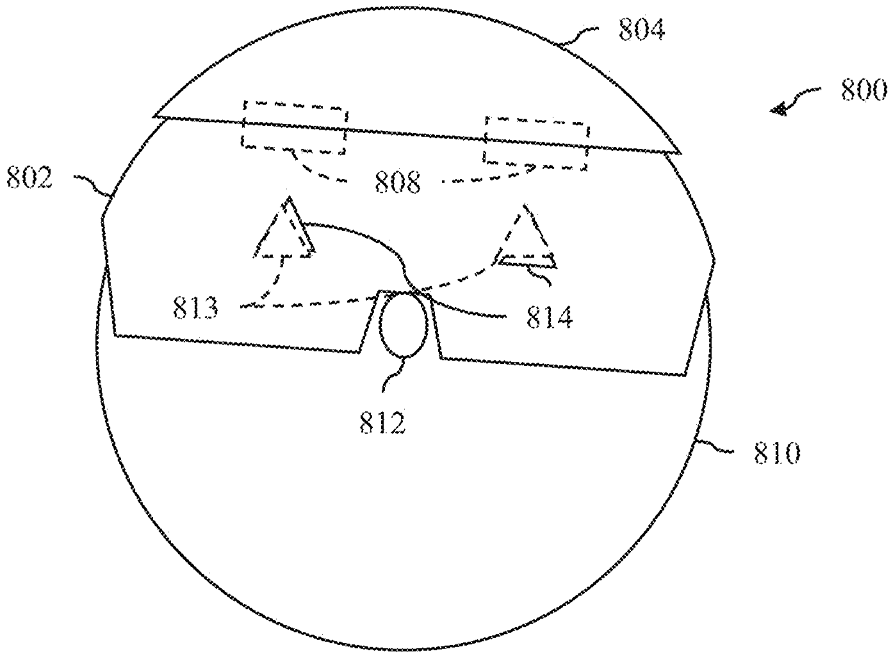
FIGS. 8B and 8C are front views of alignment of the head-mountable device of FIG. 8A.
Figure 8C:
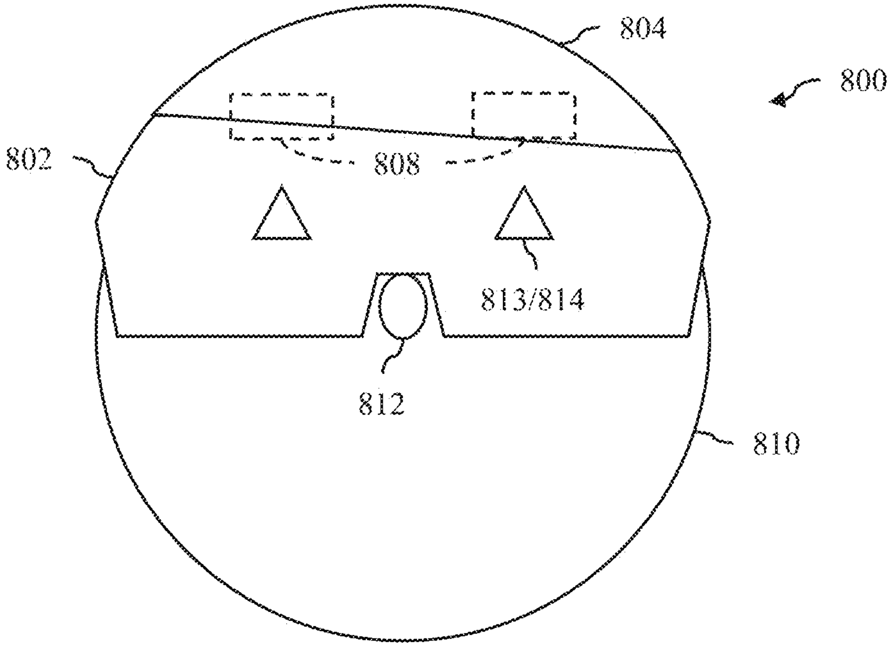

FIG. 8A illustrates a side view of an HMD 800 on a user's head 810 and FIGS. 8B and 8C illustrate front views of a misalignment and re-alignment, respectively, of the HMD 800 relative to the user's head 810. The HMD 800 includes a display 802 and a cap 804. The display 802 can include one or more optical lenses or display screens that are configured to be positioned in front of a user's eyes. The display 802 can be configured to present an augmented reality visualization, a virtual reality visualization, or another suitable visualization to the user. The display 802 can be positioned at least partially in or on the cap 804. The cap 804 can be a housing of the display 802. The cap 804 can retain and position the display 802 relative to the user's head 810. The cap 804 can be formed from rigid materials, such as rigid polymers and/or other materials. The cap 804 can contain sensors, buttons, speakers, batteries, and/or other electrical components. Hinges and/or other mechanisms can be used to couple the cap 804 to the display 802. In some examples, the cap 804 can be formed integrally as portions of the display 802. The display 802 can be configured to rest on (e.g., in contact with) or above a user's nose 812.

The HMD 800 can include sensors 806 and 808. The sensors 806, 808 can be substantially similar to, including some or all of the features of any of the sensors discussed previously. The sensor 808 can be coupled to the display 802 and/or the cap 804 and can be configured to be adjacent to a forehead region of the user's head 810. The sensors 806 can be coupled to the cap 804, and can be configured to be adjacent to the user's head 810, such as a top and backside of the user's head 810. Any number of the sensors 806 and 808 can be included, such as two of the sensors 808 adjacent to the user's forehead, two of the sensors 806 adjacent to the top of the user's head 810, and two of the sensors 806 adjacent to the backside of the user's head 810.

FIG. 8B illustrates a misalignment of the HMD 800 and the display 802 relative to the user's head 810, with actual eye positions 814 of the HMD 800 being spaced apart and rotated from aligned eye positions 813. The sensors 808, 806 can detect landmarks or features of the user's face, determine the misalignment of the HMD 800 and the display 802 relative to the user's head 810. For example, the sensors 808, 806 can detect the user's cheek bones, nose, eyebrows, brow bone, or any other features of the user's face in order to determine the alignment of the HMD 800 relative to the user's head 810. The cap 804 and/or the display 802 can include motors that alter the position of the display 802 relative to the cap 804, which can be used to at least partially correct misalignments of the display 802 relative to the user's head 810. In some examples, the HMD 800 can provide the user with instructions through the display 802 or speakers such that the user can correct the misalignment of the HMD 800 relative to the user's head. As a result, the configuration of FIG. 8C can be achieved in which the actual eye positions 814 are aligned with the aligned eye positions 813.

Figure 9:
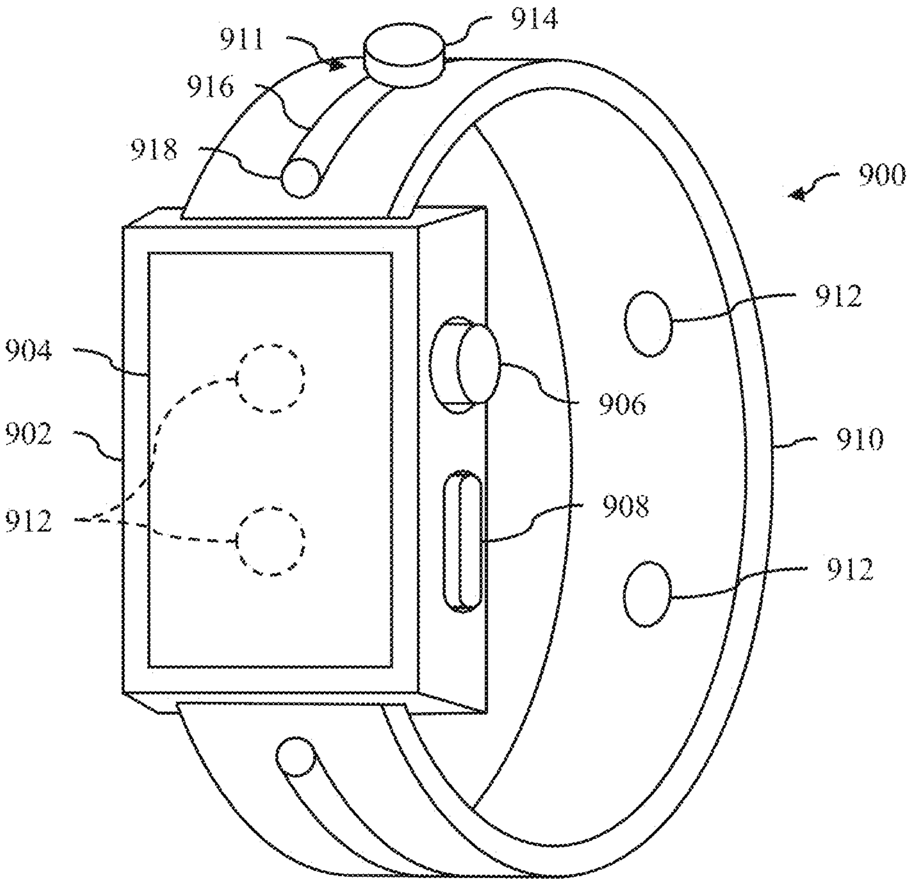
FIG. 9 is a perspective view of an electronic device.

FIG. 9 illustrates an example in which an adjustable band 910 and sensors 912 are incorporated in a wearable device 900. The wearable device 900 can be a watch, such as a smartwatch. The wearable device 900 of FIG. 9 is merely one representative example of a device that can be used in conjunction with the components and methods disclosed herein. In other words, the wearable device 900 is one non-limiting example of a device that can include sensors 912 and an adjustable band 910 as described herein. The adjustable band 910 and the sensors 912 can be substantially similar to, including some or all of the features of any of the adjustable bands and the sensors, respectively, discussed previously, such as in reference to FIGS. 1A through 8C.

The wearable device 900 can include an enclosure or housing 902. The housing 902 can be connected to a front display 904. The housing can be connected to the adjustable band 910, which is designed to attach the wearable device 900 to a user, or to provide wearable functionality. A number of input elements, such as a rotatable crown 906 and/or a button 908 can be attached to and can protrude from the housing 902.

The wearable device 900 can include a tension adjustment system 911 that can adjust tension in the adjustable band 910. The tension adjustment system 911 can include a dial 914, a band tensioning cable 916, and pulleys 918. The tension adjustment system 911 can be substantially similar to, including some or all of the features of the tension adjustment systems 504 of FIGS. 5A through 5E. The band tensioning cable 916 can extend in a loop around a perimeter of the adjustable band 910. The adjustable band 910 includes two pulleys 918 coupled to end portions of the adjustable band 910 adjacent the housing 902. The dial 914 can be disposed anywhere on the adjustable band 910, such as at an end of the adjustable band 910. In the example of FIG. 9, the tensioning system 911 includes the dial 914, which can be actuated by a user. In some examples, a motor can actuate the dial 914 based on a signal from the wearable device 900. The dial 914 can be a two-way dial that can be rotated to shorten the length of the loop of the band tensioning cable 916 and thereby increase tension on the band tensioning cable 916, or increase the length of the loop of the band tensioning cable 916 and thereby decrease tension on the band tensioning cable 916. By tightening the band tensioning cable 916, tension in the adjustable band 910 can be increased and the wearable device 900 can be held more snugly on a user's wrist. The pulleys 918 can be included to allow tension in inner and outer portions of the band tensioning cable 916 to be balanced, such that the adjustable band 910 applies consistent tension across various wrist shapes.

The sensors 912 can be positioned in or on the housing 902 and/or the strap 910. In the example of FIG. 9, two of the sensors 912 are positioned in a backside of the housing 902 opposite the front display 904 and are configured to contact a user's wrist. An additional two of the sensors 912 are positioned in an inside of the adjustable band 910 and are configured to contact the user's wrist. In some examples, the sensors 912 can include force transducers and/or IMUs, which can be used to analyze force applied between the wearable device 900 and the user's wrist and to analyze the user's movements. Tension settings in the adjustable band 910 can be adjusted through the tension adjustment system 911 either by a user in response to instructions provided through the front display 904 or a speaker, or automatically through motors connected to the tension adjustment system 911. The tension settings can be adjusted based on user preferences, forces detected by the sensors 912, movement detected by the sensors 912, a duration of use of the wearable device 900, and the like. For example, the tension settings can be increased (e.g., the adjustable band 910 can be tightened by adding tension to the band tensioning cable 916) in response to the sensors detecting the user participating in a dynamic activity, and the tension settings can be decreased (e.g., the adjustable band 910 can be loosened by decreasing tension to the band tensioning cable 916) in response to the sensors detecting the user participating in a static activity. Thus, the sensors 912 and the adjustable strap 910 can be used together to improve the fit and comfort of the wearable device 900.

Figure 10:
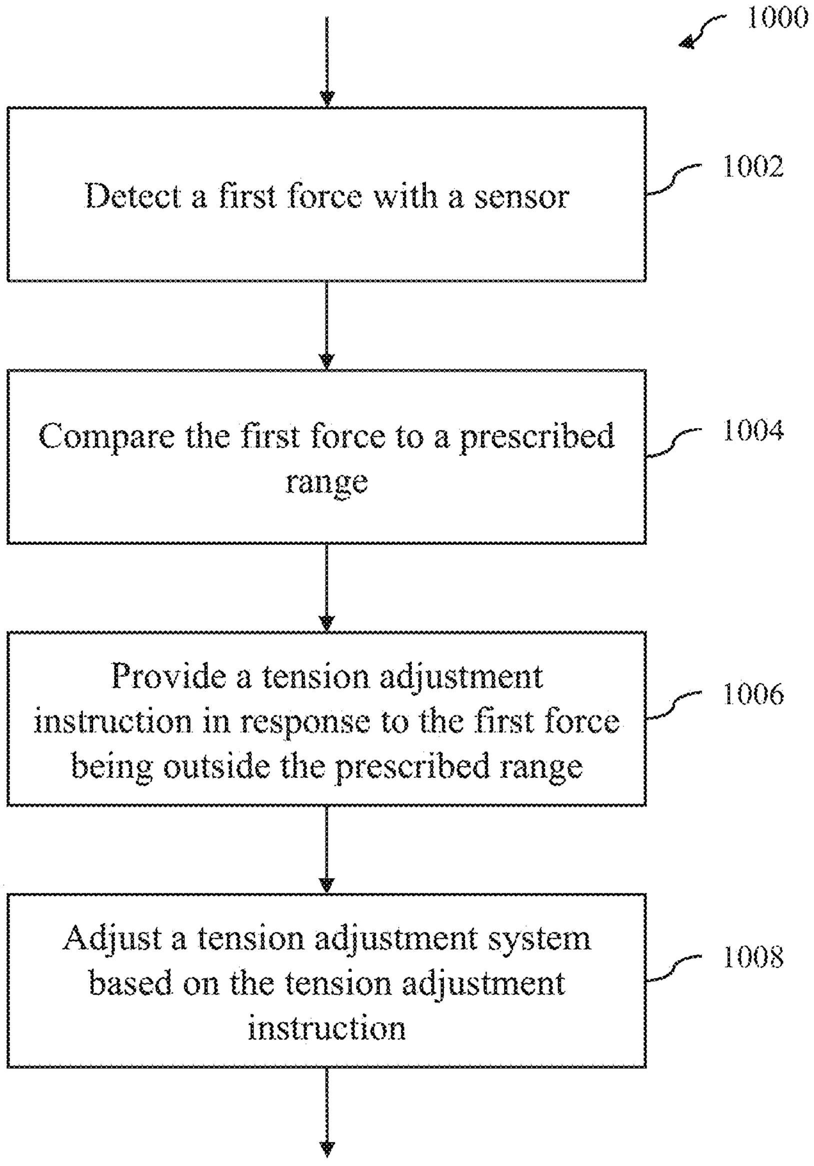
FIG. 10 is a flow chart of a method of adjusting tension in an adjustable band.

FIG. 10 illustrates a flow chart of a method 1000 of adjusting tension in an adjustable band of a wearable electronic device. The wearable electronic device can be any of the wearable electronic devices discussed previously, such as an HMD, a smart watch, or any other wearable electronic device. The wearable electronic device can include a display coupled to the adjustable band. In step 1002, a first force is detected by a sensor of the wearable electronic device. The sensor can be any of the sensors discussed previously, such as a force transducer. The first force can be a force present between the wearable electronic device and a user's body, such as the user's head, wrist, or the like. The magnitude of the first force can be dependent on tension in the adjustable band, and can be altered by adjusting the tension in the adjustable band, through a tension adjustment system or the like.

In step 1004, the first force is compared to a prescribed range. The prescribed range can be set by the wearable electronic device based on use characteristics of the wearable electronic device. The use characteristics can include user preferences, activity types for use of the wearable electronic device, duration of use of the wearable electronic device, data obtained from sensors of the wearable electronic device, and the like.

The wearable electronic device can track user preferences based on an identity of a user wearing the wearable electronic device. For example, the wearable electronic device can be associated with a particular user, the wearable electronic device can automatically detect an identity of a user when the wearable electronic device is donned (e.g., by detecting individual specific features or the like), or the user can select a user profile through the wearable electronic device. The wearable electronic device can track data relevant to the user's preferences in a user profile. The user preference data can include use patterns of the user (e.g., what types of activities and durations the user uses the wearable electronic device for), tension settings selected by the user through the tension adjustment system, forces present between the wearable electronic device and the user's body after the user adjusts the adjustable band, and the like. The prescribed range can be set according to stored user preferences, and can be modified based on the activity types for use of the wearable electronic device, the duration of use of the wearable electronic device, the data obtained from the sensors of the wearable electronic device, and the like.

The activity types for use of the wearable electronic device can be determined by activities selected by the user of the wearable electronic device, as well as data obtained from the sensors of the wearable electronic device. The activity types can range from static or passive activities to dynamic activities. The prescribed range for the first force can be greater for dynamic activities and lower for passive activities. Regardless of whether the user selects a dynamic or passive activity on the wearable electronic device, the user's use of the wearable electronic device can be dynamic or passive, such that the data obtained from the sensors of the wearable electronic device can control over the user's activity selection on the wearable electronic device. For example, a user can select an exercise routine and experience the exercise routine in a static position, or the user can select a book or movie to experience while exercising. An activity level can be selected based on the activity type determined for use by the user. The prescribed range for the first force can be updated or otherwise altered based on the activity types and/or the activity levels. In some examples, the prescribed range for the first force can be set to a minimal value for maintaining the wearable electronic device in a position relative to the user's body based on the determined activity types and/or the activity levels.

The duration of use can be tracked as the user uses the wearable electronic device, and can be predicted based on activities selected by the user and the user profile of the user. The wearable electronic device can become less comfortable as the duration of use increases, such that the prescribed range for the first force can be decreased as the duration of use increases. In some examples, altering the first force in either direction (e.g., increasing or decreasing the prescribed range) can increase comfort, and the prescribed range for the first force can be varied over time, such as by cyclically increasing and decreasing the prescribed range for the first force.

The data obtained from the sensors of the wearable electronic device can be used to update the user preferences, determine the activity types and/or activity levels for use of the wearable electronic device, and determine an orientation of the wearable electronic device. The orientation of the wearable electronic device, such as the orientation of the wearable electronic device relative to gravity, can affect how much tension is utilized to maintain the wearable electronic device in a position. For example, in examples in which the wearable electronic device is a watch, relatively greater tension can be used to maintain the wearable electronic device in position when the user's arm is parallel to gravity, and relatively lower tension can be used to maintain the wearable electronic device in position when the user's arm is perpendicular to gravity. As such, the prescribed range for the first force can be updated or otherwise altered based on the orientation of the wearable electronic device detected by the sensors.

In step 1006, a tension adjustment instruction is provided in response to the first force being outside the prescribed range. In some examples, the tension adjustment instruction can be provided to a user, and the user can adjust the tension in the adjustable band through the tension adjustment system. The tension adjustment instruction can be provided to the user through the display of the wearable electronic device, a speaker of the wearable electronic device, a device connected to the wearable electronic device, or the like. In some examples, the tension adjustment instruction can be a digital signal, which can be provided by the wearable electronic device to a motor of the tension adjustment system. As such, the wearable electronic device can automatically adjust the tension in the adjustable band through the tension adjustment system, and in response to data from the sensors.

In step 1008, the tension adjustment system is used to adjust tension in the adjustable band. The tension can be adjusted based on the tension adjustment instruction. In examples in which the tension adjustment instruction is an instruction provided to the user, the user can manually adjust the tension in the adjustable band by rotating an adjustment knob or dial of the tension adjustment system. In examples in which the tension adjustment instruction is a digital signal, the motor of the tension adjustment system can automatically adjust the tension in the adjustable band. As such, tension in the adjustable band can be adjusted by the tension adjustment system. The tension in the adjustable band can be adjusted in response to the first force detected by the sensor. Additionally, the tension in the adjustable band can be adjusted in response to the user preferences, the activity types/levels, duration of use for the wearable electronic device, other data collected by the sensors, and the like. Adjusting the tension in the adjustable band through the tension adjustment system can be used to improve the fit and comfort of the wearable electronic device.

Figure 11:
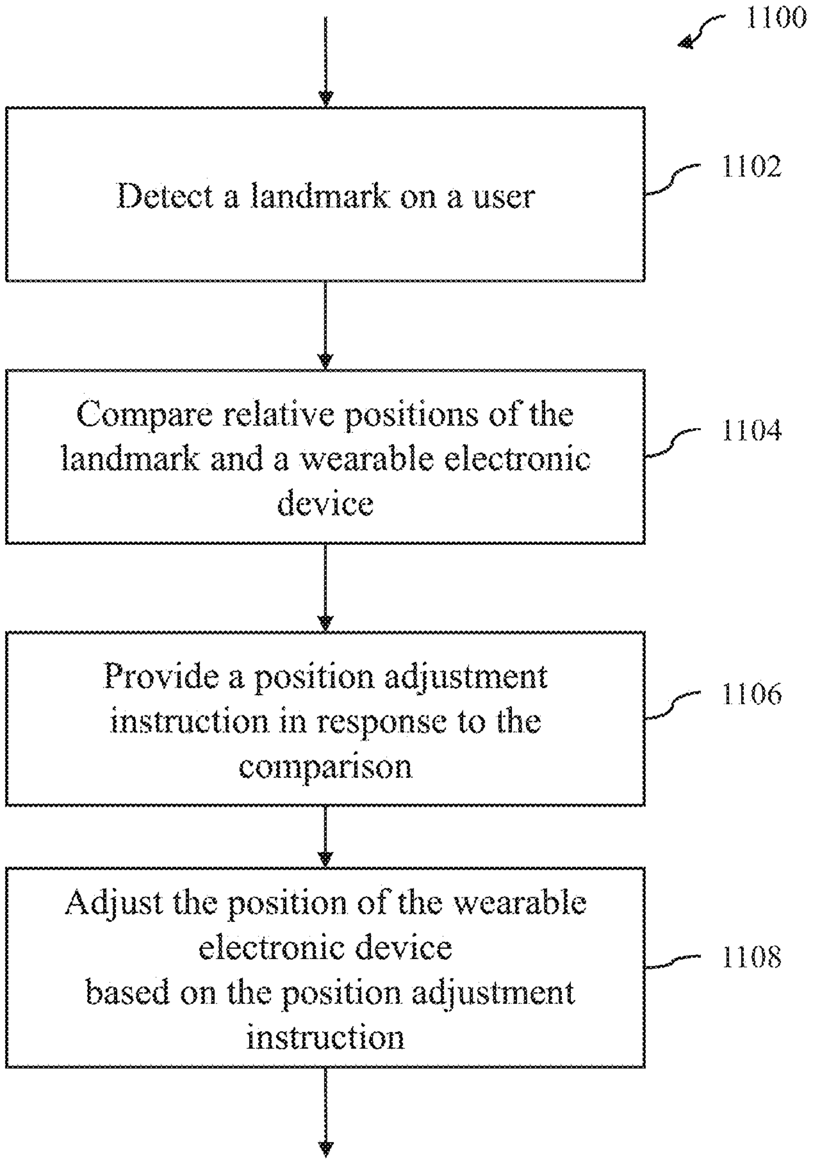
FIG. 11 is a flow chart of a method of adjusting a position of an electronic device.

FIG. 11 is a flow chart of a method 1100 of adjusting a position of a wearable electronic device. The wearable electronic device can be any of the wearable electronic devices discussed previously, such as an HMD, a smart watch, or any other wearable electronic device. The wearable electronic device can include a display coupled to the adjustable band. In step 1102, a landmark on a user is detected by a sensor of the wearable electronic device. The sensor can be any of the sensors discussed previously, such as an optical sensor, one or more force transducers, or the like. For examples in which the wearable electronic device is an HMD, the landmark can be the user's cheek bones, nose, eyebrows, brow bone, eyes, freckles, hairline, or any other features of the user's face that can be used to determine alignment of the wearable electronic device relative to the user's head or face. The sensor can generate a signal, such as a force signal, an image signal, or the like, which can be sent to a processor of the wearable electronic device to be analyzed in order to detect the landmark on the user.

In step 1104, the position of the landmark is compared to a position of the wearable electronic device. The processor of the wearable electronic device can compare the position of the landmark with the position of the sensor in order to determine relative positions of the landmark and the wearable electronic device.

In step 1106, a position adjustment instruction is provided in response to the comparison of the position of the landmark to the position of the wearable electronic device. In some examples, the position adjustment instruction can be provided to a user, and the user can adjust the position of the wearable electronic device on their body in response to the position adjustment instruction. The position adjustment instruction can be provided to the user through the display of the wearable electronic device, a speaker of the wearable electronic device, a device connected to the wearable electronic device, or the like. In some examples, the position adjustment instruction can be a digital signal, which can be provided by the wearable electronic device to a motor of the wearable electronic device. As such, the wearable electronic device can automatically adjust the position of the wearable electronic device in response to data from the sensors.

In step 1108, the position of the wearable electronic device is adjusted based on the position adjustment instruction. In examples in which the position adjustment instruction is an instruction provided to the user, the user can manually adjust the position of the wearable electronic device. In examples in which the position adjustment instruction is a digital signal, the motor of the wearable electronic device can automatically adjust the position of the wearable electronic device. The position of the wearable electronic device can be adjusted in response to the landmarks detected by the sensor. Adjusting the position of the wearable electronic device ensures that the wearable electronic device is properly aligned with the user's body (e.g., in an example of an HMD, the display of the HMD is aligned with the user's eyes), which improves comfort and functionality of the wearable electronic device.

Figure 12:
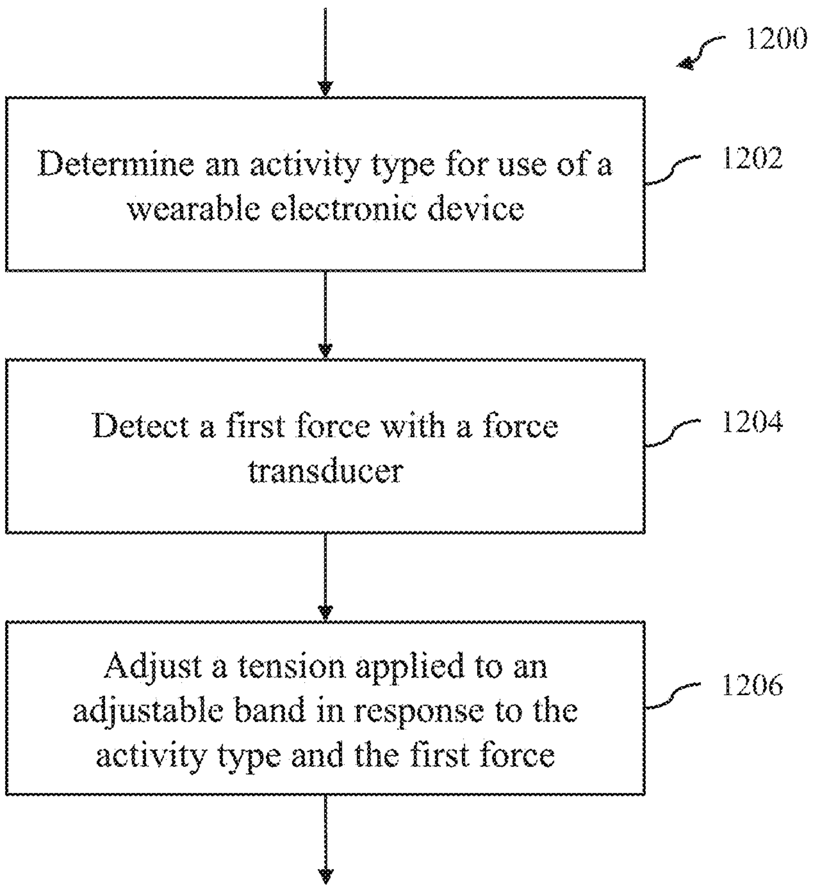
FIGS. 12, 13, and 14 are flow charts of methods of adjusting tension in adjustable bands.

FIG. 12 illustrates a flow chart of a method 1200 of adjusting tension in an adjustable band of a wearable electronic device. The wearable electronic device can be any of the wearable electronic devices discussed previously, such as an HMD, a smart watch, or any other wearable electronic device. The wearable electronic device can include a display coupled to the adjustable band. In step 1202, an activity type for use of the wearable electronic device is determined. The activity types for use of the wearable electronic device can be determined by activities selected by the user of the wearable electronic device, as well as data obtained from sensors of the wearable electronic device. The activity types can range from static or passive activities to dynamic activities. The adjustable band can be adjusted to have relatively greater tension for dynamic activities and relatively less tension for passive activities.

Regardless of whether the user selects a dynamic or passive activity on the wearable electronic device, the user's use of the wearable electronic device can be dynamic or passive, such that the data obtained from the sensors of the wearable electronic device can control over the user's activity selection on the wearable electronic device. For example, a user can select an exercise routine and experience the exercise routine in a static position, or the user can select a book or movie to experience while exercising. An activity level can be selected based on the activity type determined for use by the user. The tension in the adjustable band can be adjusted based on the activity types and/or the activity levels. In some examples, the tension applied by the adjustable band can be set to a minimal value for maintaining the wearable electronic device in a position relative to the user's body based on the determined activity types and/or the activity levels. Based on the activity type and/or activity level determined by the wearable electronic device, a prescribed range for tension in the adjustable band can be selected.

In step 1204, a first force is detected by a force transducer of the wearable electronic device. The first force can be a force present between the wearable electronic device and the user's body, such as the user's head, wrist, or the like. The magnitude of the first force can be dependent on tension in the adjustable band, and can be altered by adjusting the tension in the adjustable band, through a tension adjustment system or the like.

In step 1206, tension applied to the adjustable band is adjusted in response to the determined activity type and the first force. The activity type and/or activity level associated with use of the wearable electronic device can be used to set a prescribed range for tension to be applied to a user through the adjustable band. The first force can be used to determine the tension that is currently being applied to the user through the adjustable band. Based on this determination, the wearable electronic device can determine whether more or less tension should be applied to the user through the adjustable band. The tension applied to the adjustable band can be adjusted through a tension adjustment system, which can be adjusted manually by the user, or automatically by the wearable electronic device. As a result, the wearable electronic device can adjust tension applied to the user through the adjustable band in response to the activity type determined by the wearable electronic device and the first force detected by the force transducer. Adjusting the tension in the adjustable band through the tension adjustment system can be used to improve the fit and comfort of the wearable electronic device.

Figure 13:
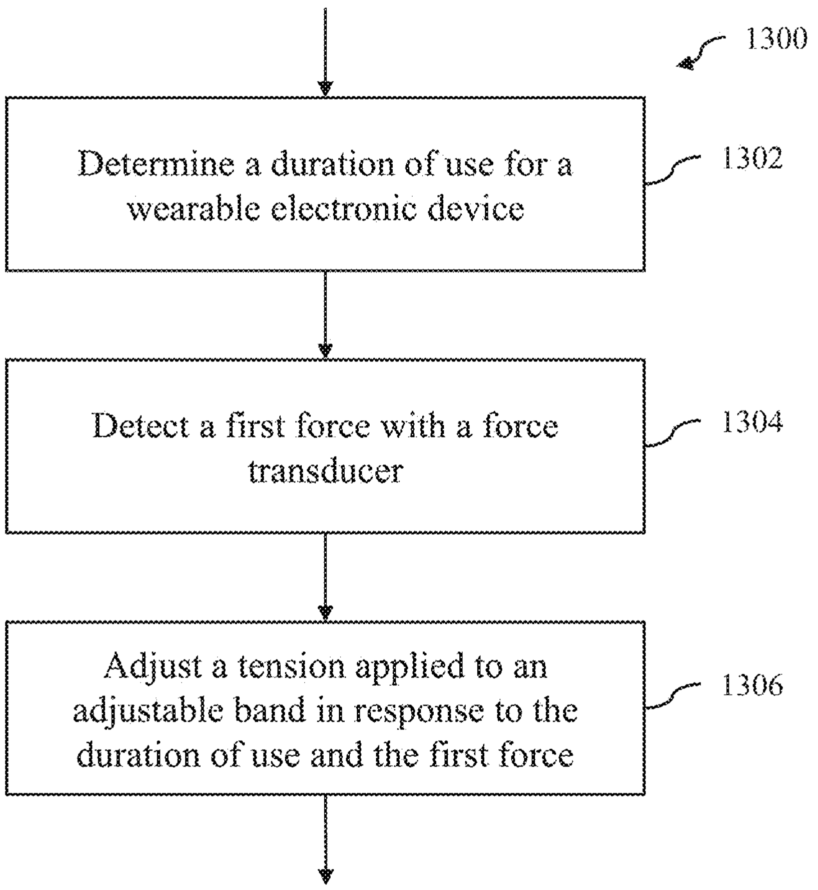

FIG. 13 illustrates a flow chart of a method 1300 of adjusting tension in an adjustable band of a wearable electronic device. The wearable electronic device can be any of the wearable electronic devices discussed previously, such as an HMD, a smart watch, or any other wearable electronic device. The wearable electronic device can include a display coupled to the adjustable band. In step 1302, a duration of use for the wearable electronic device is determined. The duration of use can be tracked as a user uses the wearable electronic device. The duration of use can also be predicted based on activities selected by the user, the user profile of the user, and the like. The wearable electronic device can become less comfortable as the duration of use increases, such that a prescribed range for tension applied to the user through the adjustable band can be decreased as the duration of use increases. In some examples, altering the tension applied to the user through the adjustable band in either direction (e.g., increasing or decreasing the tension applied to the user through the adjustable band) can increase comfort, and the prescribed range for the tension applied to the user through the adjustable band can be varied over time, such as by cyclically increasing and decreasing the prescribed range.

In step 1304, a first force is detected by a force transducer of the wearable electronic device. The first force can be a force present between the wearable electronic device and the user's body, such as the user's head, wrist, or the like. The magnitude of the first force can be dependent on tension in the adjustable band, and can be altered by adjusting the tension in the adjustable band, through a tension adjustment system or the like.

In step 1306, tension applied to the adjustable band is adjusted in response to the determined duration of use and the first force. The duration of use of the wearable electronic device can be used to set a prescribed range for tension to be applied to the user through the adjustable band. The first force can be used to determine the tension that is currently being applied to the user through the adjustable band. Based on this determination, the wearable electronic device can determine whether more or less tension should be applied to the user through the adjustable band. The tension applied to the adjustable band can be adjusted through a tension adjustment system, which can be adjusted manually by the user, or automatically by the wearable electronic device. As a result, the wearable electronic device can adjust tension applied to the user through the adjustable band in response to the duration of use of the wearable electronic device and the first force detected by the force transducer. Adjusting the tension in the adjustable band through the tension adjustment system can be used to improve the fit and comfort of the wearable electronic device.

Figure 14:
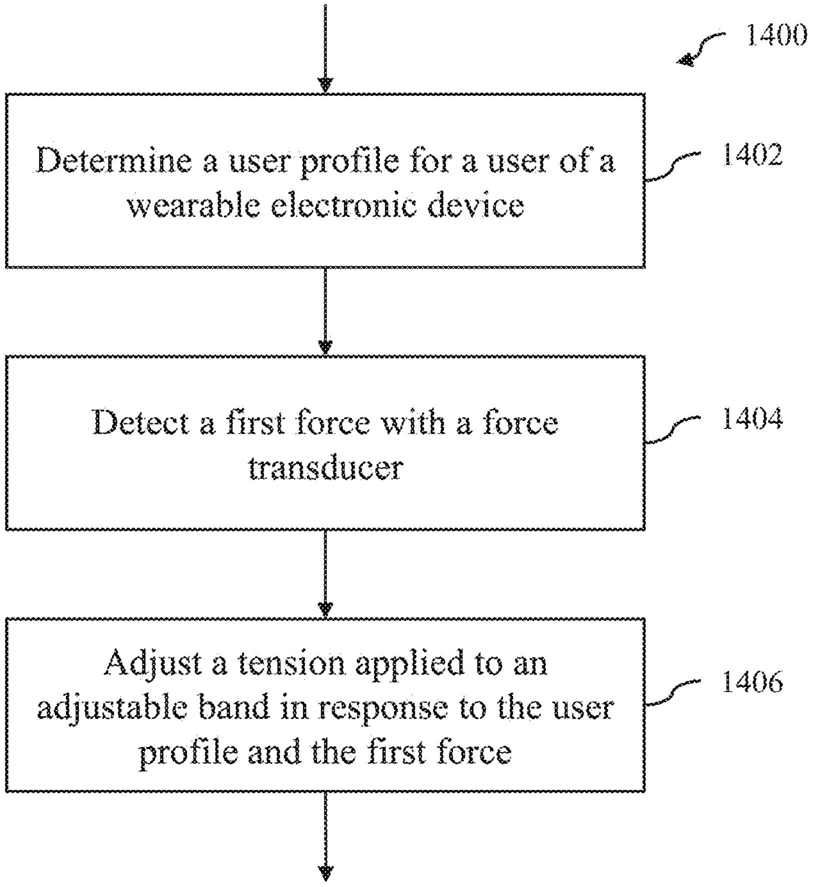

FIG. 14 illustrates a flow chart of a method 1400 of adjusting tension in an adjustable band of a wearable electronic device. The wearable electronic device can be any of the wearable electronic devices discussed previously, such as an HMD, a smart watch, or any other wearable electronic device. The wearable electronic device can include a display coupled to the adjustable band. In step 1402, a user profile for a user of the wearable electronic device is determined. The wearable electronic device can be associated with a single user. The wearable electronic device can detect an identity of a user by detecting landmarks or other features of the user, such as by performing facial recognition or the like. The user can select a user profile, such as by entering a username and password or otherwise selecting the user profile. The user profile can include preferences selected by the user (e.g., user preferences). The user profile can be generated by the wearable electronic device in response to selections made by the user. For example, each time that the user adjusts tension in the adjustable band of the wearable electronic device, the wearable electronic device can record the user's tension settings and update the user's user profile. The user profile can include a prescribed range of values for tension in the adjustable band preferred by the user.

In step 1404, a first force is detected by a force transducer of the wearable electronic device. The first force can be a force present between the wearable electronic device and the user's body, such as the user's head, wrist, or the like. The magnitude of the first force can be dependent on tension in the adjustable band, and can be altered by adjusting the tension in the adjustable band, through a tension adjustment system or the like.

In step 1406, tension applied to the adjustable band is adjusted in response to the determined user profile and the first force. The determined user profile can be used to set the prescribed range for tension to be applied to the user through the adjustable band. The first force can be used to determine the tension that is currently being applied to the user through the adjustable band. Based on this determination, the wearable electronic device can determine whether more or less tension should be applied to the user through the adjustable band. The tension applied to the adjustable band can be adjusted through a tension adjustment system, which can be adjusted manually by the user, or automatically by the wearable electronic device. As a result, the wearable electronic device can adjust tension applied to the user through the adjustable band in response to the determined user profile and the first force detected by the force transducer. Adjusting the tension in the adjustable band through the tension adjustment system can be used to improve the fit and comfort of the wearable electronic device.

In some examples, the present systems and methods can be customized to each user. This customization can include capturing, storing, analyzing, transmitting, and/or using personal information. In instances where personal information is captured, stored, analyzed, transmitted, and/or used, such treatment should follow well-known, accepted, and respected processes and procedures. Additionally, the present description includes specific details that are not required to practice the various examples. Rather, many modifications, substitutions, and variations can be made to the details provided herein, and in view of the above teachings.

What is claimed is:

1. A head-mountable device (HMD), comprising:
a display;
a housing coupled to the display;
a force transducer coupled to the housing; and
an adjustable band coupled to the housing, wherein:
the adjustable band is adjustable in response to a pressure detected by the force transducer and a first prescribed tension range selected by a user for a first selected activity;
the first prescribed tension range for the first activity is defined in a user profile; and
a second prescribed tension for a second activity is defined in the user profile.

2. The HMD of claim 1, wherein:
the force transducer comprises a first force transducer;
the HMD further comprises:
a second force transducer; and
a tension adjustment system coupled to the adjustable band;
the first force transducer is configured to be adjacent to a forehead region of a user of the HMD; and
the second force transducer is configured to be adjacent to a maxilla region or a zygoma region of the user of the HMD.

3. The HMD of claim 2, wherein the tension adjustment system is configured to automatically adjust tension in the adjustable band in response to at least one of a first pressure detected by the first force transducer or a second pressure detected by the second force transducer.

4. The HMD of claim 1, wherein the display is configured to provide tension adjustment instructions in response to the pressure detected by the force transducer.

5. The HMD of claim 1, wherein the adjustable band comprises:
a cable; and
a dial connected to the cable, the dial configured to alter an effective length of the cable to adjust tension applied to the adjustable band by the cable.

6. The HMD of claim 1, wherein the adjustable band comprises:
a first tension adjustment system configured to adjust tension applied to a first region of the adjustable band; and
a second tension adjustment system configured to adjust tension applied to a second region of the adjustable band independent from the first tensioning system.

7. The HMD of claim 1, further comprising a tension adjustment system configured to adjust tension in the adjustable band in response to the pressure detected by the force transducer, wherein the tension adjustment system comprises a motor electrically coupled to a processor of the HMD.

8. An electronic device comprising:
- a display;
- a pressure sensor coupled to the display; and
- an adjustable band coupled to the display, the adjustable band comprising a tension adjustment system configured to adjust tension in the adjustable band in response to a signal from the pressure sensor and a duration signal indicating a duration of use of the electronic device for a current use session.

9. The electronic device of claim 8, wherein the tension adjustment system comprises:
- a cable coupled to the adjustable band; and
- a dial configured to adjust an effective length of the cable in response to the signal from the pressure sensor.

10. The electronic device of claim 8, further comprising an inertial measurement unit, wherein the tension adjustment system is further configured to adjust the tension in the adjustable band in response to a signal from the inertial measurement unit indicating an orientation of the electronic device.

11. The electronic device of claim 8, wherein the display is configured to display instructions for adjusting the tension in the adjustable band in response to the signal from the pressure sensor.

12. The electronic device of claim 8, further comprising an optical sensor coupled to the display, the display configured to display instructions for adjusting a position of the electronic device in response to a signal from the optical sensor.

13. A method comprising:
- determining a position of a wearable electronic device relative to a landmark on a user;
- determining an alignment position of the wearable device relative to the user;
- determining a misalignment of the wearable electronic device relative to the landmark on the user based on the position of the wearable electronic device and the alignment position;
- detecting, with a sensor, a force between the wearable electronic device and the user;
- providing a position adjustment instruction in response to the determined position of the wearable electronic device relative to the landmark on the user and the force detected by the sensor; and
- automatically adjusting a position of the wearable electronic device in response to the position adjustment instruction.

14. The method of claim 13, further comprising providing a tension adjustment instruction to the user in response to the detected force, wherein the tension in the adjustable band is adjusted in response to the tension adjustment instruction.

15. The method of claim 13, further comprising providing a tension adjustment instruction to a motor of a tension adjustment system of the wearable electronic device in response to the detected force, wherein the tension in the adjustable band is adjusted in response to the tension adjustment instruction.

16. The method of claim 13, further comprising:
- determining an activity type for use of the wearable electronic device by the user; and
- adjusting the tension in the adjustable band in response to the determined activity type.

17. The method of claim 13, further comprising:
- determining a duration of use for the wearable electronic device by the user; and
- adjusting the tension in the adjustable band in response to the determined duration of use.

18. The method of claim 13, further comprising:
- associating the wearable electronic device with a user profile; and
- adjusting the tension in the adjustable band in response to the associated user profile.

19. The method of claim 13, wherein:
- determining the misalignment of the wearable electronic device relative to the landmark on the user comprises determining a rotation between an actual eye position and an aligned eye position.

20. The method of claim 13, wherein:
- the sensor comprises a force transducer; and
- the tension is adjusted by a tension adjustment system comprising a cable and a dial, the method further comprising:
  - adjusting the tension in the adjustable band by rotating the dial to alter an effective length of the cable.

* * * * *